(12) United States Patent
Mori et al.

(10) Patent No.: US 8,331,042 B2
(45) Date of Patent: Dec. 11, 2012

(54) IMAGING LENS AND IMAGING APPARATUS

(75) Inventors: Masao Mori, Saitama (JP); Hiromitsu Yamakawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 19 days.

(21) Appl. No.: 13/193,159

(22) Filed: Jul. 28, 2011

(65) Prior Publication Data

US 2012/0026608 A1 Feb. 2, 2012

(30) Foreign Application Priority Data

Jul. 29, 2010 (JP) ................................. 2010-169990

(51) Int. Cl.
*G02B 9/62* (2006.01)
(52) U.S. Cl. ......... 359/761; 359/713; 359/749; 359/752
(58) Field of Classification Search .................. 359/713, 359/749, 752, 761
See application file for complete search history.

(56) References Cited

U.S. PATENT DOCUMENTS

| 5,870,234 | A | * | 2/1999 | Ebbesmeier nee Schitthof ....................... 359/713 |
| 6,507,444 | B2 | | 1/2003 | Hayashide et al. |
| 8,054,562 | B2 | * | 11/2011 | Asami ........................... 359/761 |
| 2009/0002849 | A1 | * | 1/2009 | Kim et al. ..................... 359/749 |
| 2009/0219630 | A1 | | 9/2009 | Yamamoto |

FOREIGN PATENT DOCUMENTS

| JP | 04-216519 | 8/1992 |
| JP | 08-160297 | 6/1996 |
| JP | 2008-275783 | 11/2008 |

* cited by examiner

*Primary Examiner* — Evelyn A. Lester
(74) *Attorney, Agent, or Firm* — Young & Thompson

(57) ABSTRACT

An imaging lens includes a first lens that is a negative meniscus lens having a concave surface facing the image side of the imaging lens, a second lens that is a positive lens having a convex surface facing the object side of the imaging lens, a third lens that is a negative lens having a concave surface facing the image side, a fourth lens that is a double-convex lens, a fifth lens that is a negative meniscus lens having a concave surface facing the object side, and a sixth lens that is a negative lens, which are arranged in this order from the object side.

14 Claims, 15 Drawing Sheets

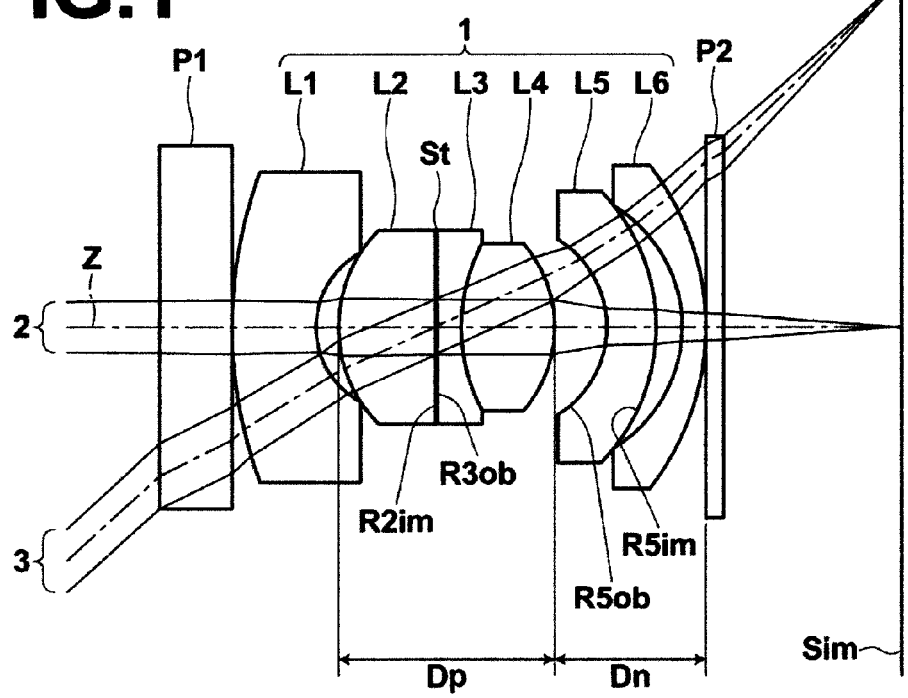
FIG.1
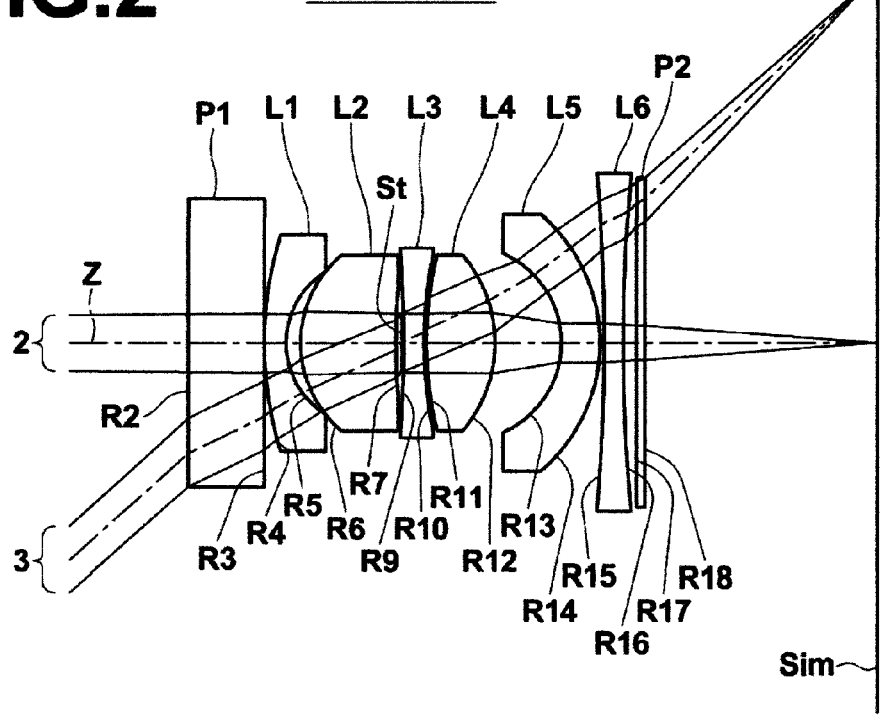
FIG.2  EXAMPLE 1

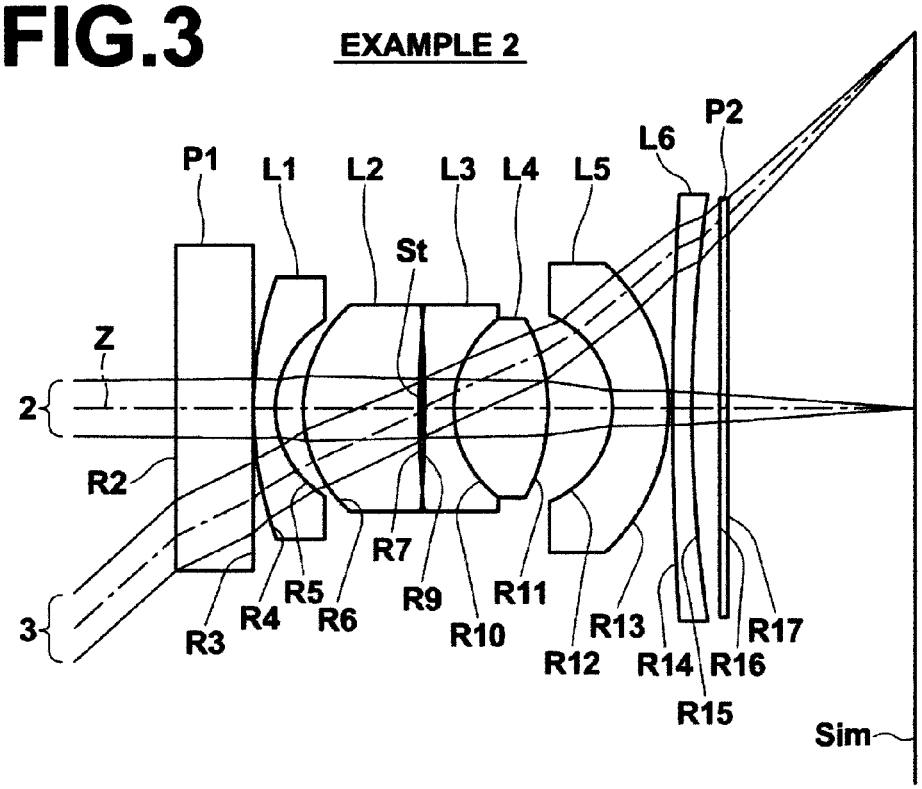
FIG.3 EXAMPLE 2
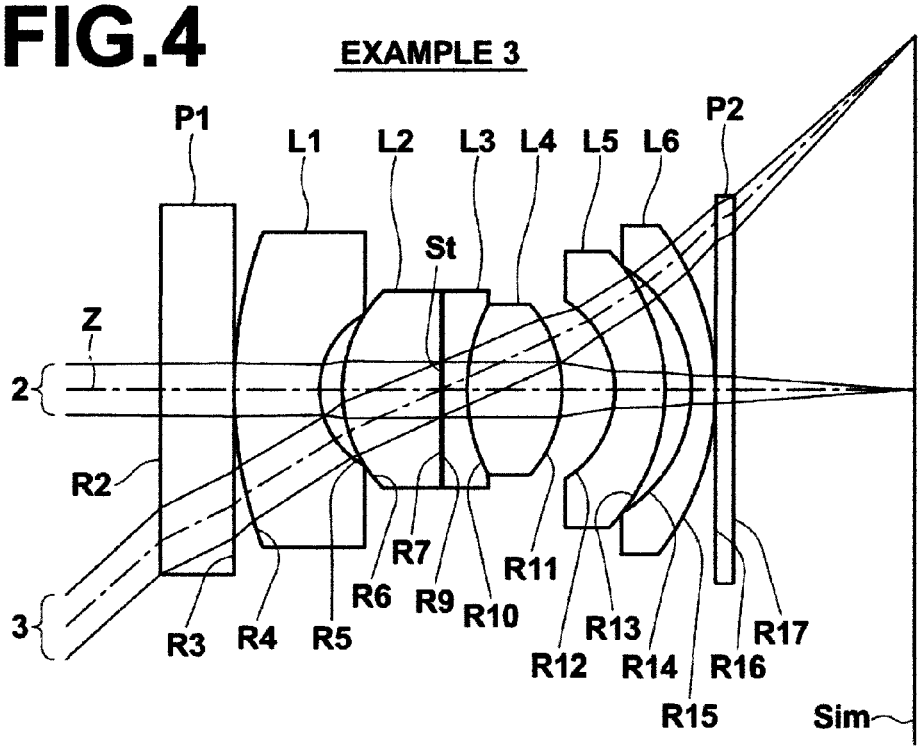
FIG.4 EXAMPLE 3

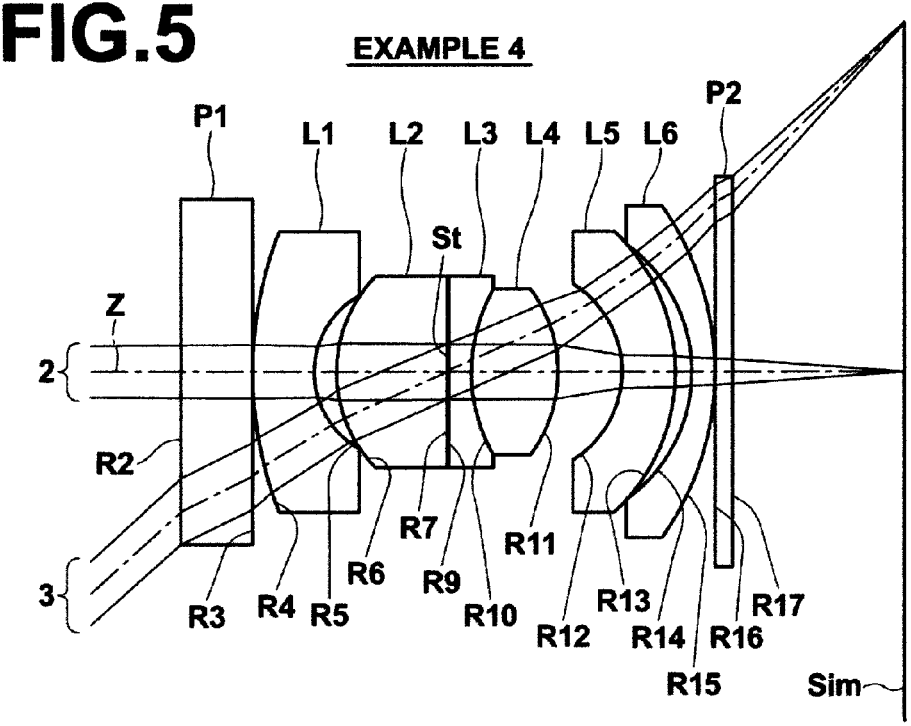
FIG.5 EXAMPLE 4
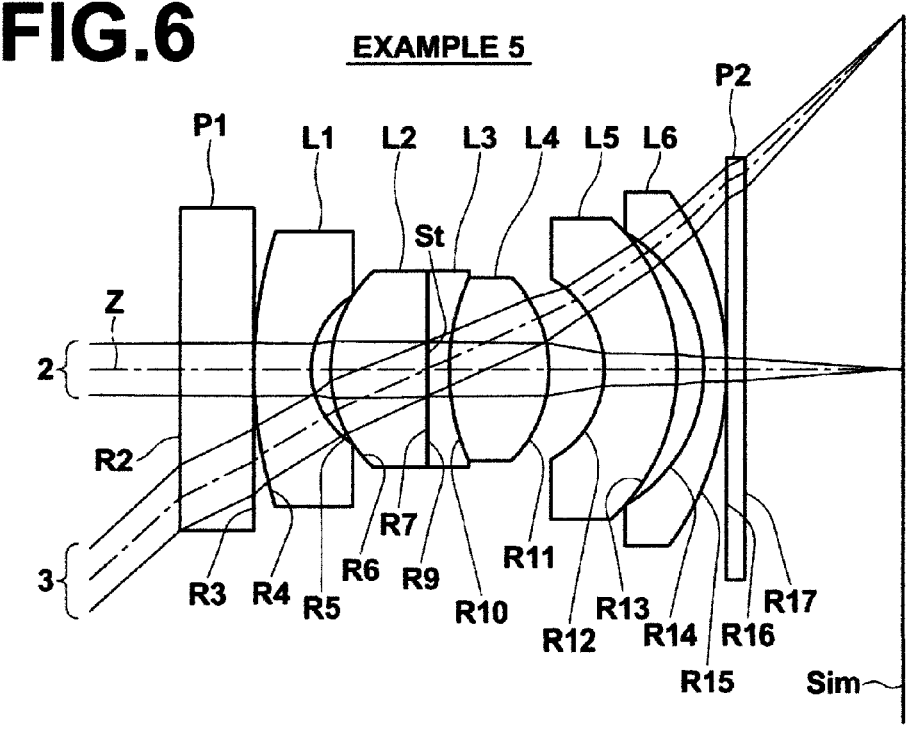
FIG.6 EXAMPLE 5

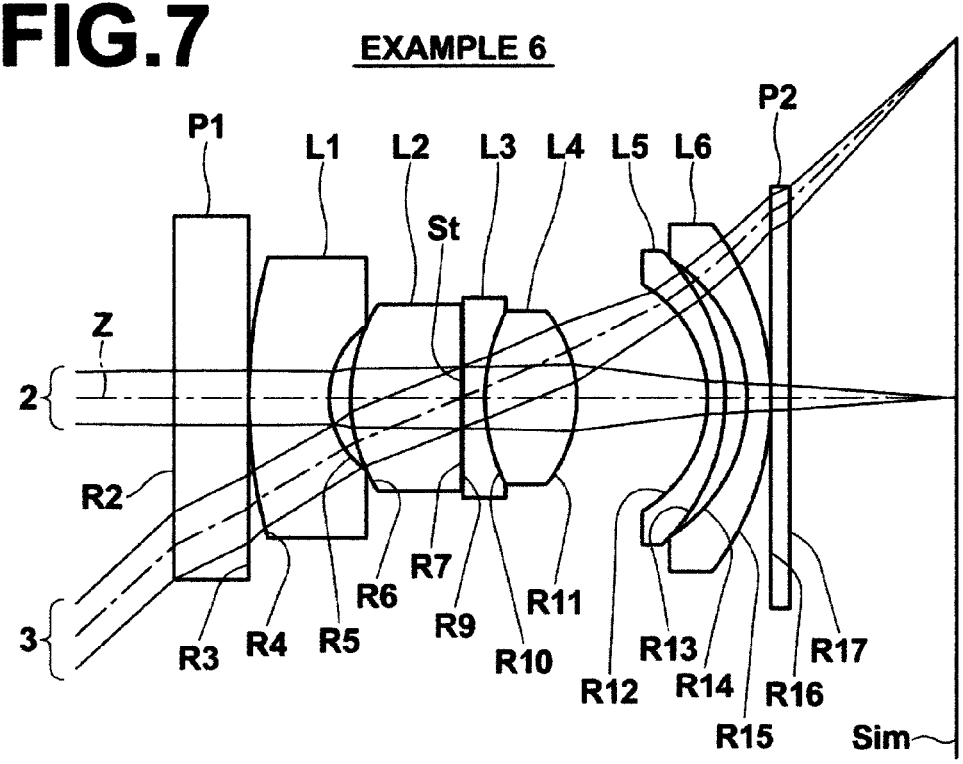
FIG.7 EXAMPLE 6
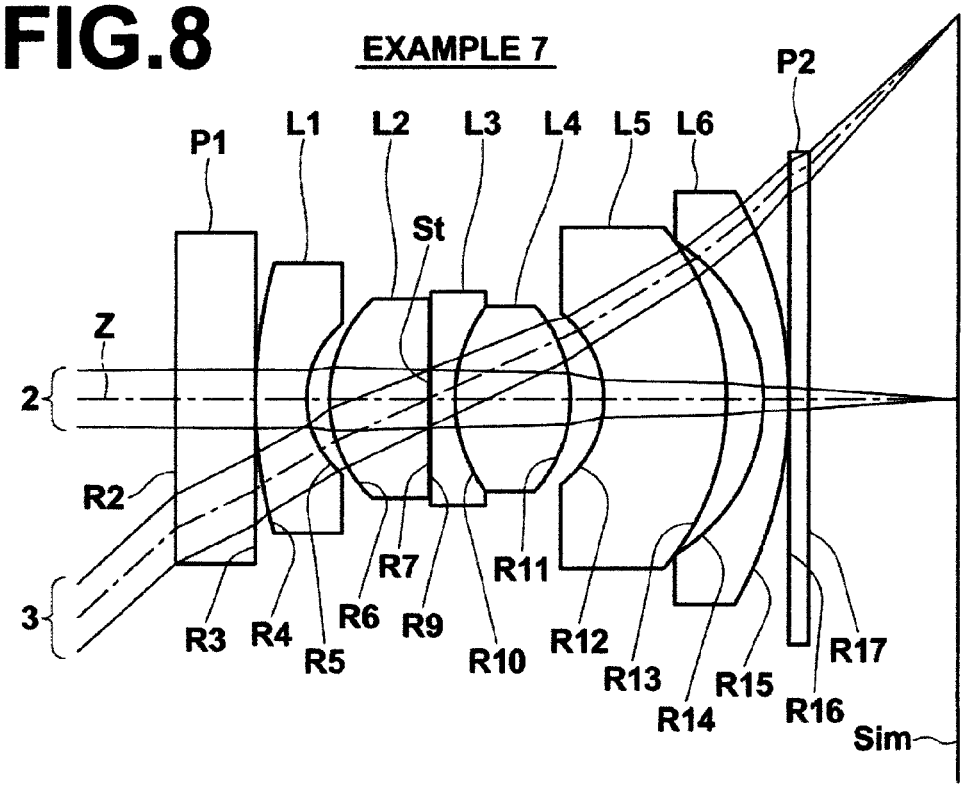
FIG.8 EXAMPLE 7

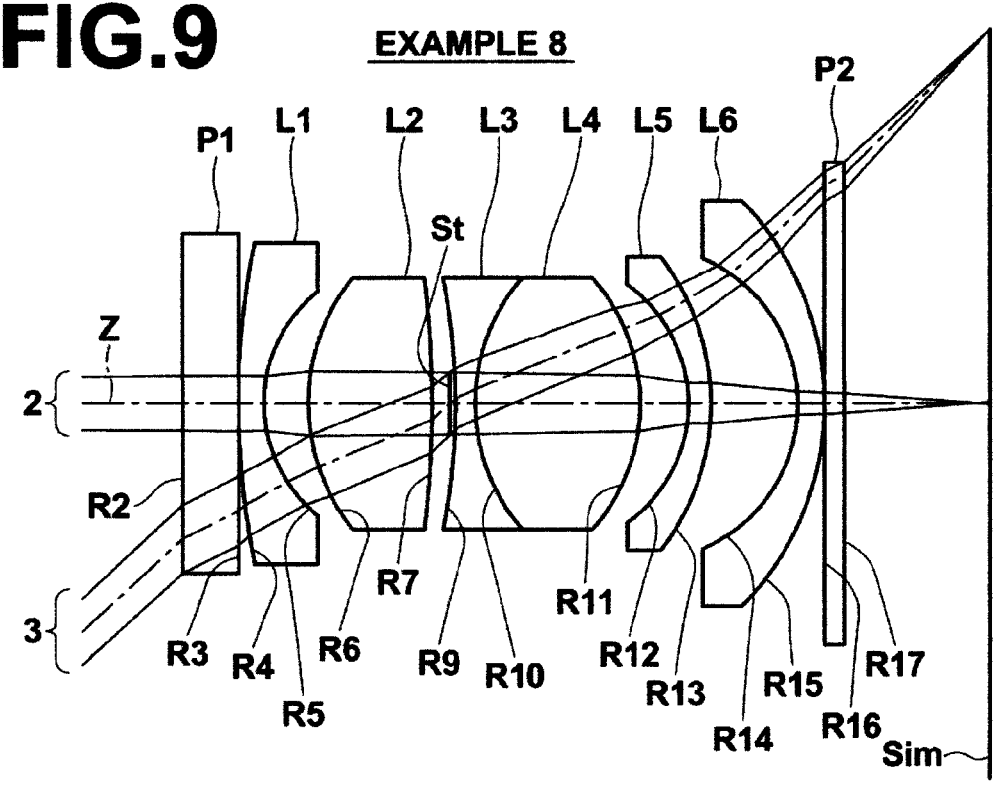
FIG.9 EXAMPLE 8

EXAMPLE 1
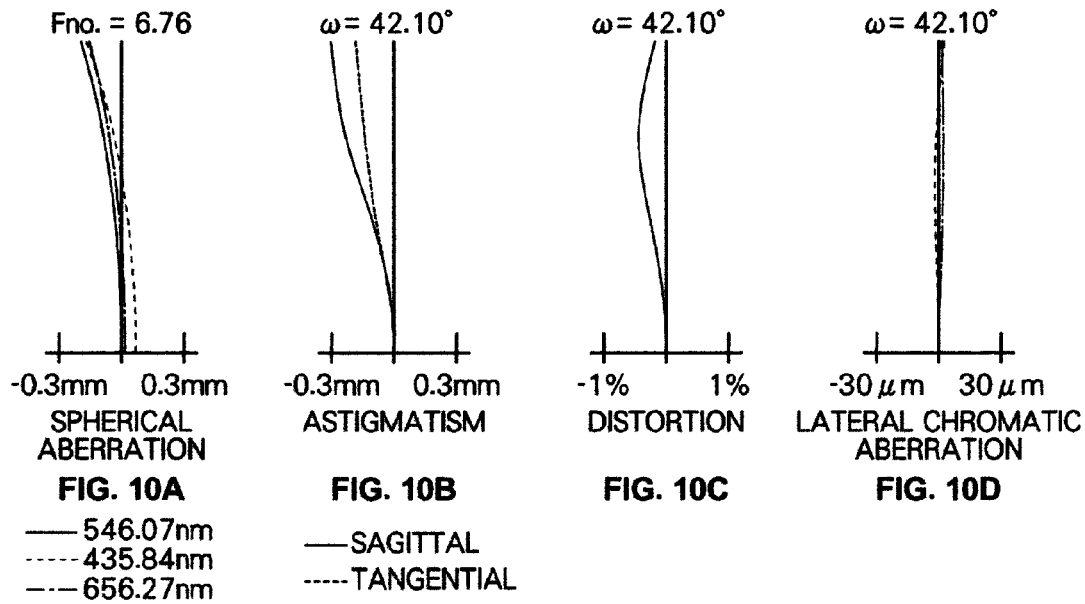
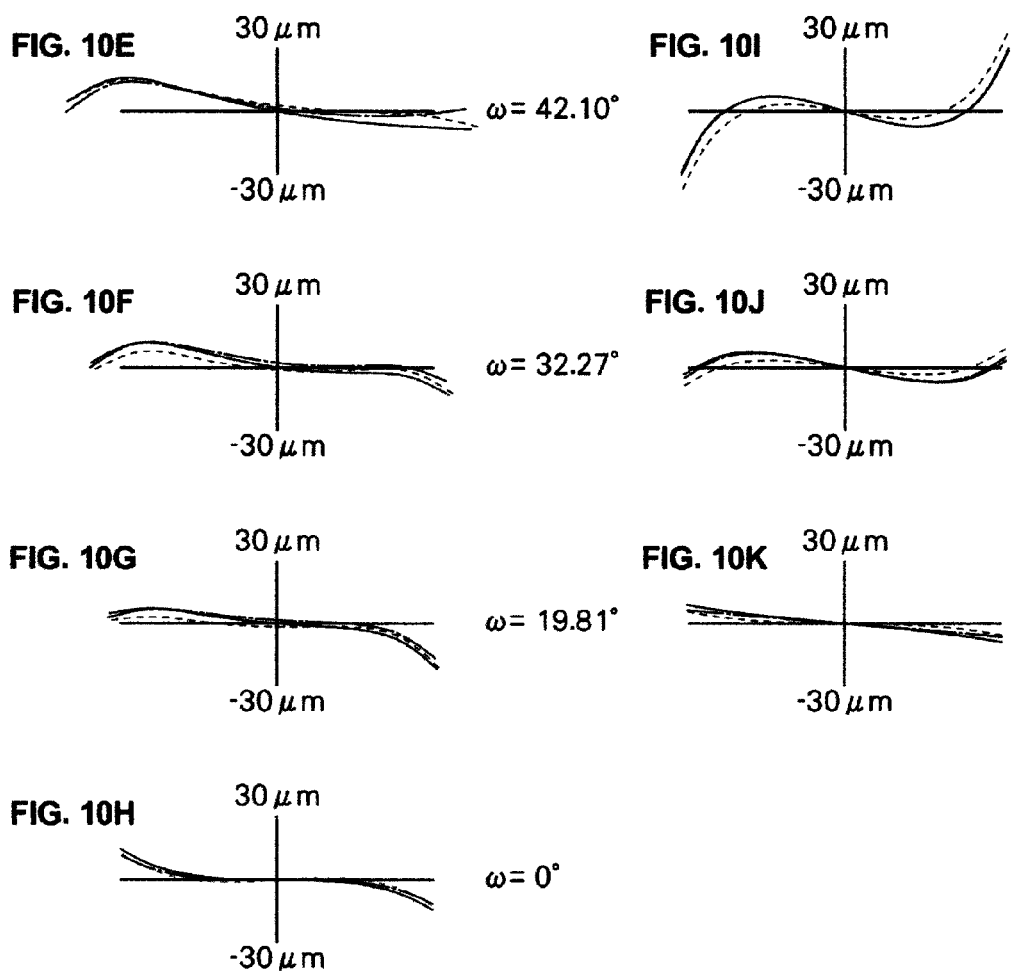

EXAMPLE 2
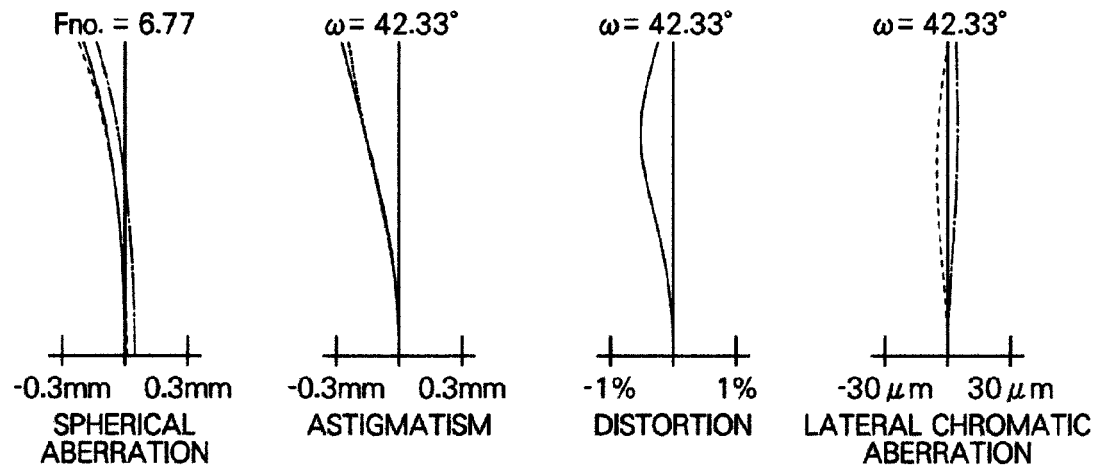
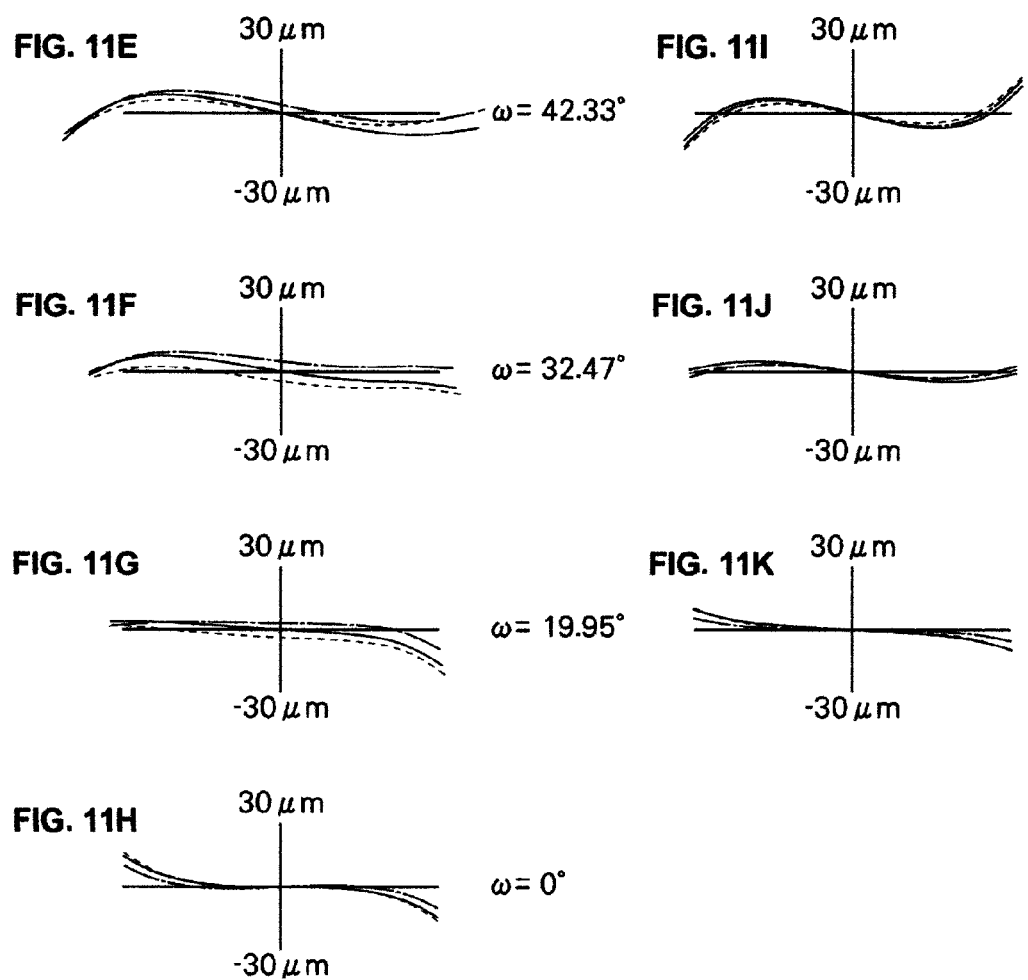

EXAMPLE 3
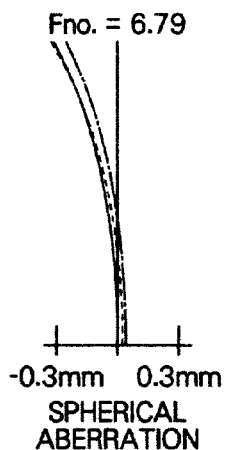
Fno. = 6.79
-0.3mm  0.3mm
SPHERICAL ABERRATION
FIG. 12A
—— 546.07nm
----- 435.84nm
—·— 656.27nm
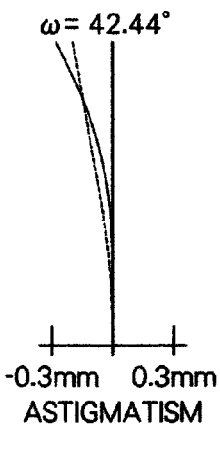
ω = 42.44°
-0.3mm  0.3mm
ASTIGMATISM
FIG. 12B
—— SAGITTAL
----- TANGENTIAL
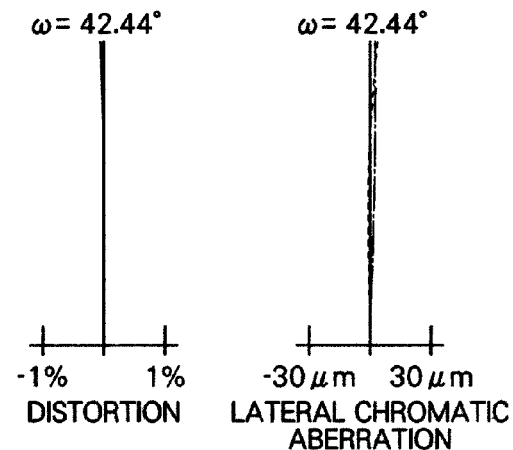
ω = 42.44°
-1%  1%
DISTORTION
FIG. 12C
ω = 42.44°
-30μm  30μm
LATERAL CHROMATIC ABERRATION
FIG. 12D
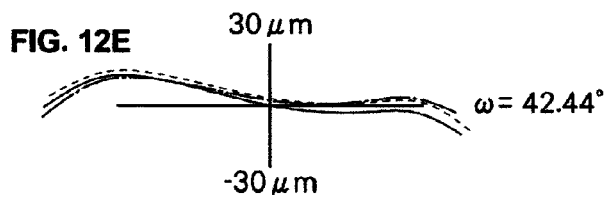
FIG. 12E ω = 42.44°
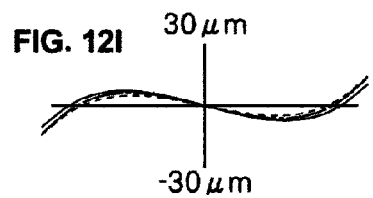
FIG. 12I
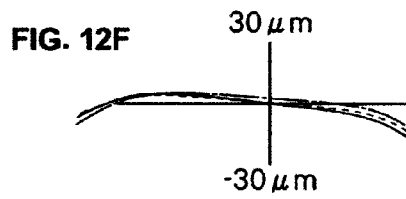
FIG. 12F ω = 32.55°
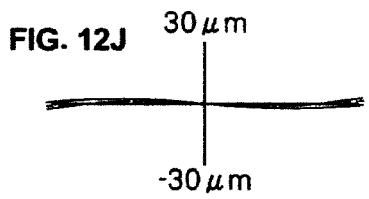
FIG. 12J
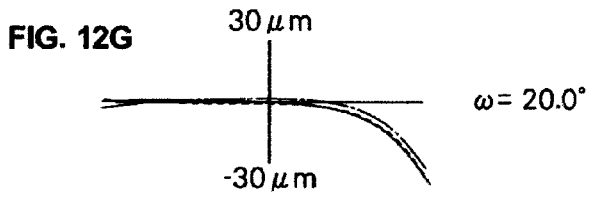
FIG. 12G ω = 20.0°
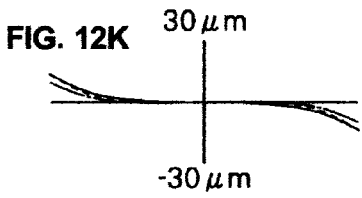
FIG. 12K
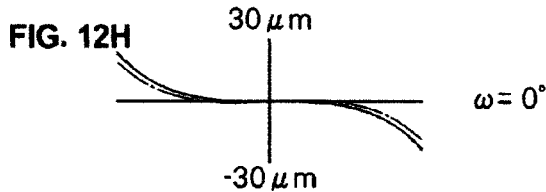
FIG. 12H ω = 0°

EXAMPLE 4
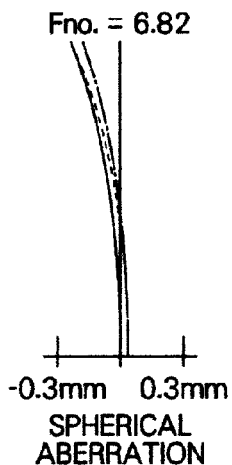
Fno. = 6.82
-0.3mm 0.3mm
SPHERICAL
ABERRATION
FIG. 13A
— 546.07nm
---- 435.84nm
—·— 656.27nm
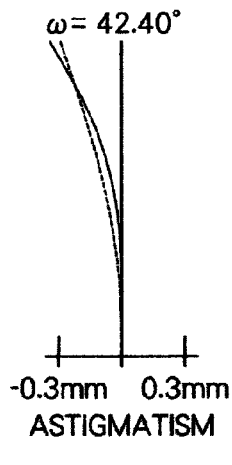
ω= 42.40°
-0.3mm 0.3mm
ASTIGMATISM
FIG. 13B
— SAGITTAL
---- TANGENTIAL
ω= 42.40°
-1%   1%
DISTORTION
FIG. 13C
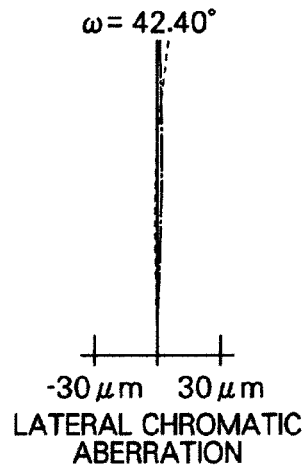
ω= 42.40°
-30μm 30μm
LATERAL CHROMATIC
ABERRATION
FIG. 13D
  ω= 42.40°

ω= 32.52°

ω= 19.98°

ω= 0°

EXAMPLE 5

Fno. = 6.80

-0.3mm 0.3mm
SPHERICAL
ABERRATION

——546.07nm
-----435.84nm
—·—656.27nm

ω = 42.47°

-0.3mm 0.3mm
ASTIGMATISM

——SAGITTAL
-----TANGENTIAL

ω = 42.47°

-1%  1%
DISTORTION

ω = 42.47°

-30μm  30μm
LATERAL CHROMATIC
ABERRATION

ω = 42.47°

ω = 32.58°

ω = 20.02°

ω = 0°

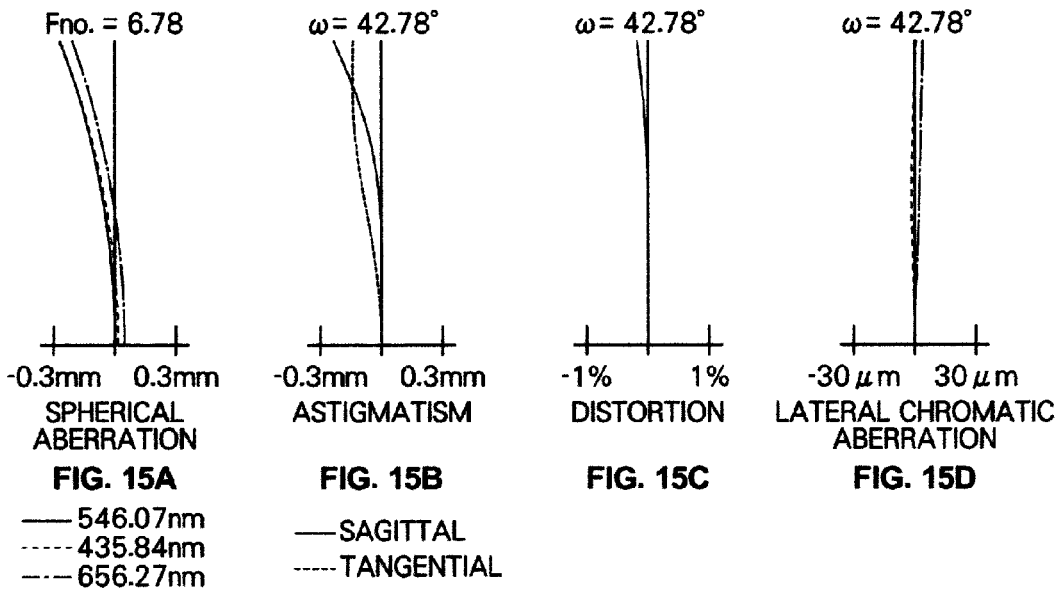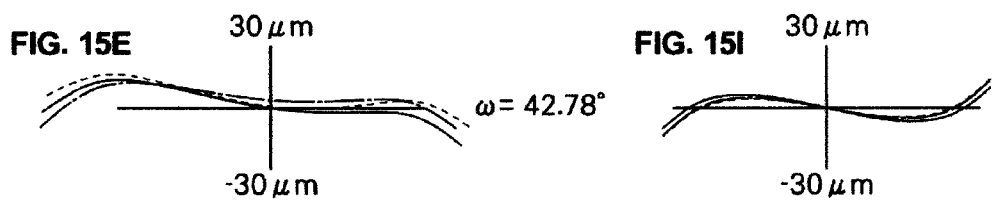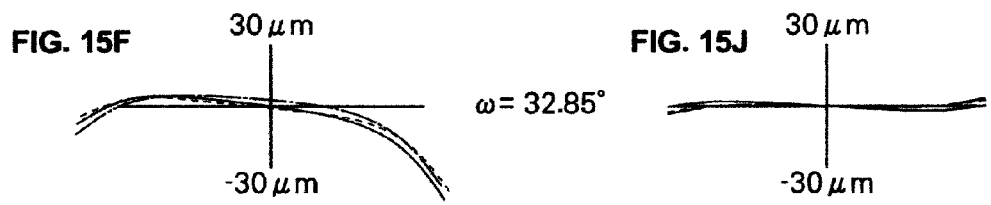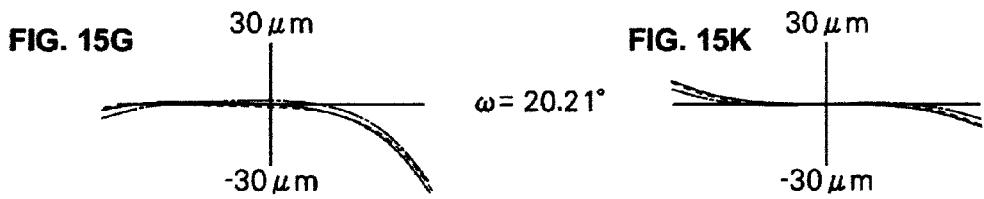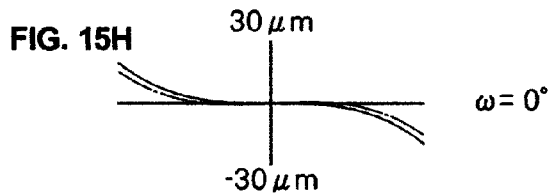

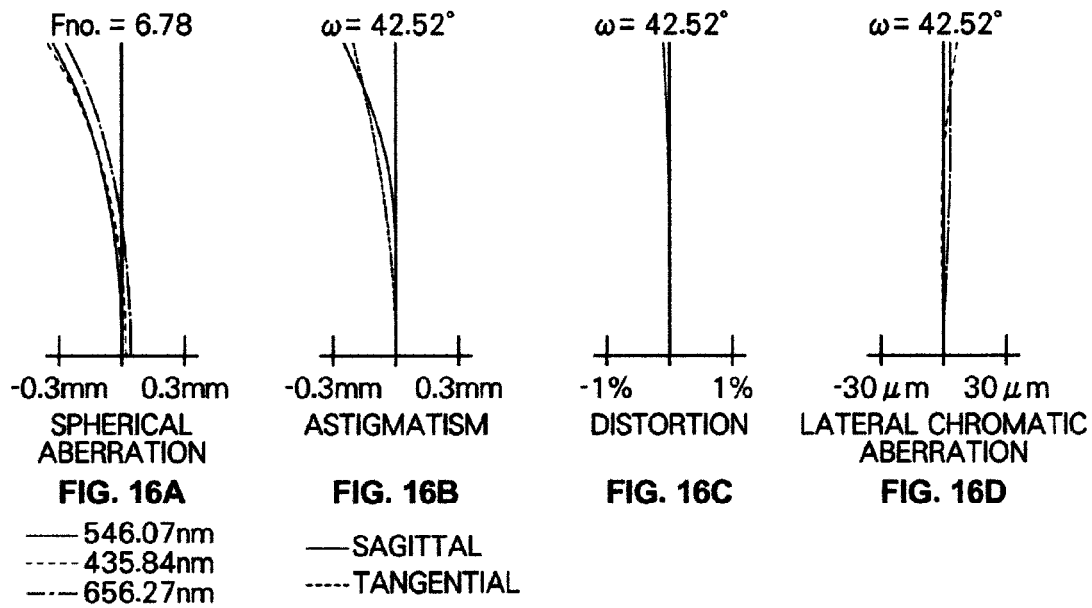
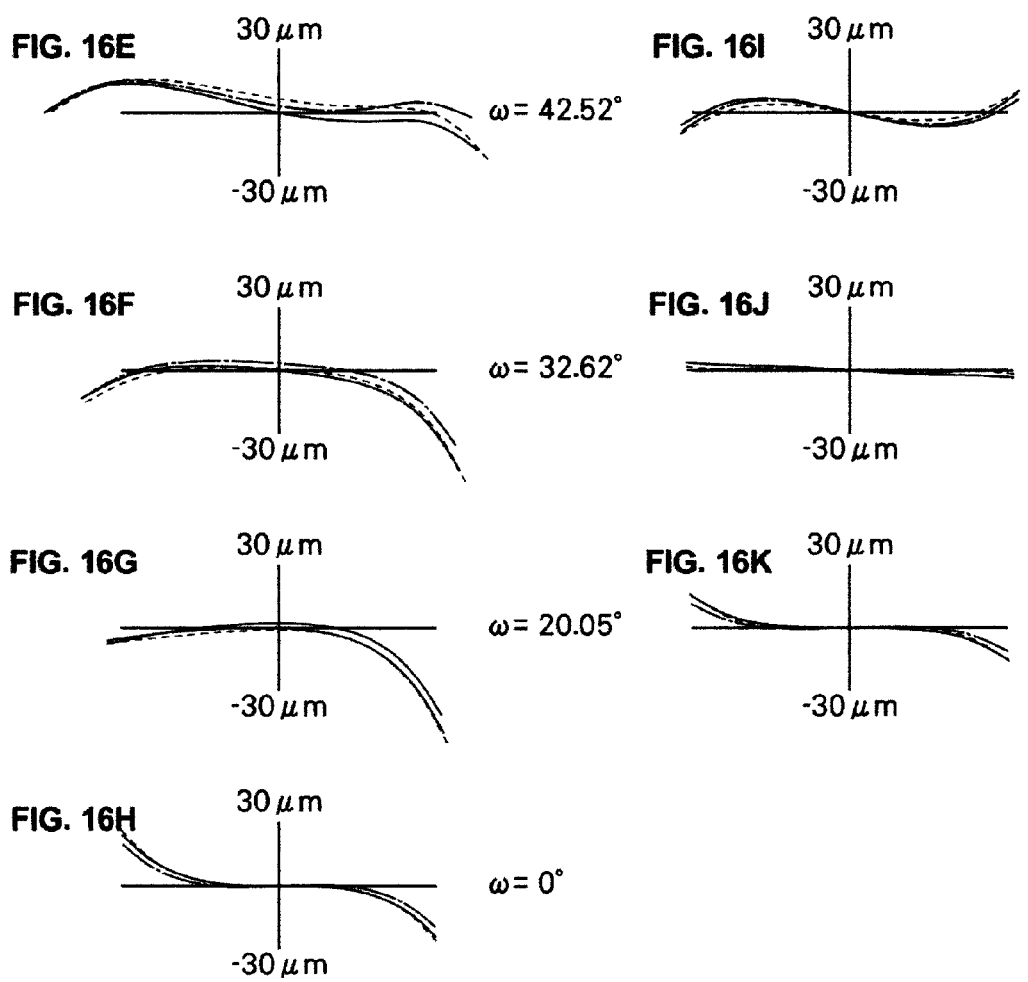

EXAMPLE 8
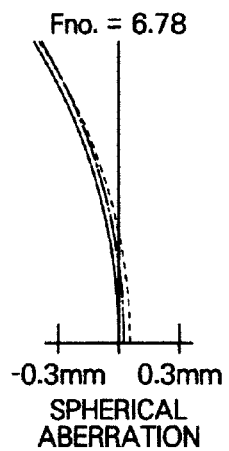
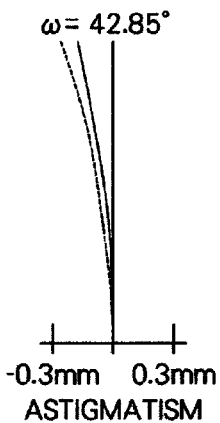
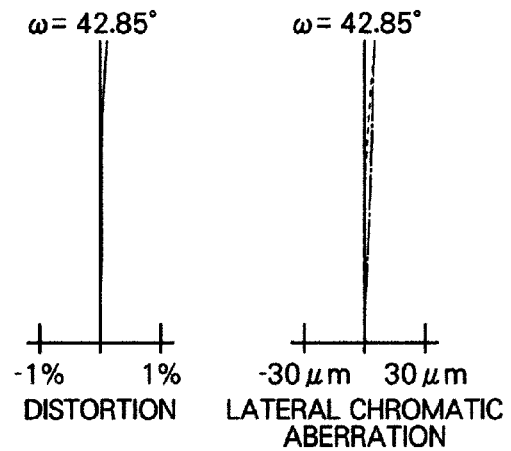
FIG. 17A Spherical Aberration (-0.3mm to 0.3mm), Fno. = 6.78
FIG. 17B Astigmatism (-0.3mm to 0.3mm), ω = 42.85°
FIG. 17C Distortion (-1% to 1%), ω = 42.85°
FIG. 17D Lateral Chromatic Aberration (-30μm to 30μm), ω = 42.85°
—— 546.07nm
---- 435.84nm
—·— 656.27nm
—— SAGITTAL
---- TANGENTIAL
FIG. 17E  ω = 42.85°
FIG. 17F  ω = 32.93°
FIG. 17G  ω = 20.27°
FIG. 17H  ω = 0°
FIG. 17I
FIG. 17J
FIG. 17K

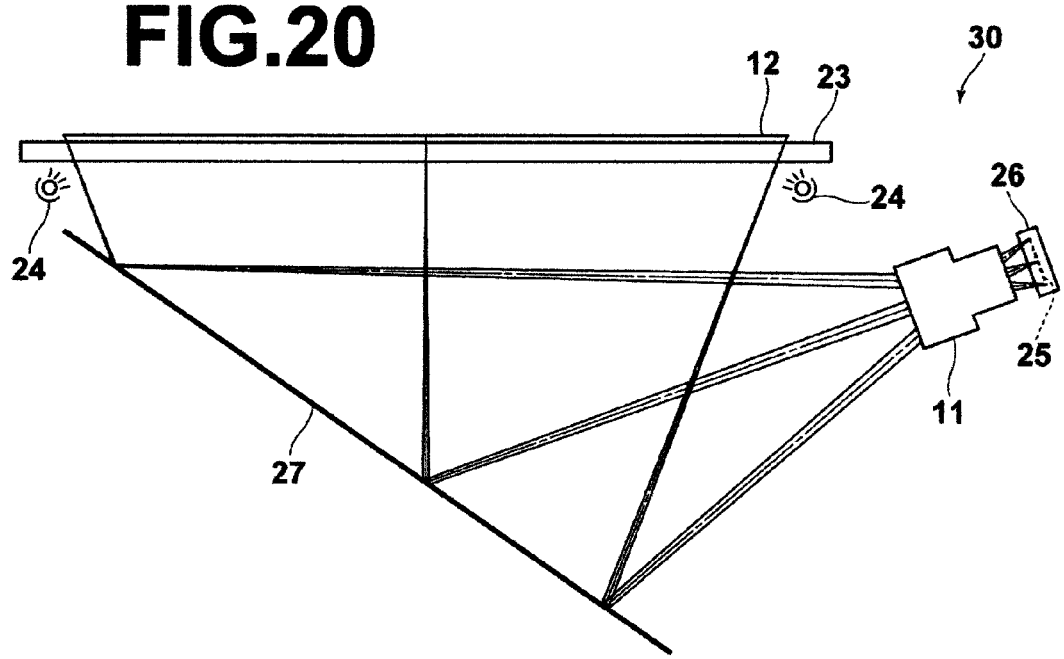

IMAGING LENS AND IMAGING APPARATUS

FIELD OF THE INVENTION

The present invention relates to an imaging lens and an imaging apparatus. In particular, the present invention relates to an imaging lens that is appropriate as a readout lens for reading out an image in an original, and to an imaging apparatus including the imaging lens.

DESCRIPTION OF THE RELATED ART

Conventionally, image readout apparatuses were known. The image readout apparatus reads out an image in an original by using a lens, and forms an image on an imaging device, such as a CCD (Charge Coupled Device). Further, image data representing the image are converted into signals. Such image readout apparatuses need to faithfully read out data representing the image in the original. Therefore, various aberrations, such as curvature of field and distortion, need be corrected in an excellent manner in imaging lenses used for readout. Further, as the density of imaging devices became higher in recent years, imaging lenses having higher resolution became requested.

Further, a wider angle lens for the image readout apparatus has became strongly requested. Conventionally, wider angles were attempted in image readout lenses disclosed, for example, in Japanese Unexamined Patent Publication No. 4 (1992)-216519 (Patent Document 1), Japanese Unexamined Patent Publication No. 8 (1996)-160297 (Patent Document 2), U.S. Pat. No. 6,507,444 (Patent Document 3), Japanese Unexamined Patent Publication No. 2008-275783 (Patent Document 4), and U.S. Patent Application Publication No. 2009219630 (Patent Document 5). Patent Document 1 discloses a readout lens having a full angle of view of 60 degrees, and which is composed of five elements. In Patent Document 1, a positive meniscus lens is arranged on the most image side. Patent Document 2 discloses a readout lens having a full angle of view of 60 degrees, and which is composed of four elements. In Patent Document 2, a positive meniscus lens is arranged on the most image side. Patent Document 3 discloses an image formation lens having a full angle of view of approximately 60 degrees, and which is composed of five elements. A surface in the image formation lens disclosed in Patent Document 3 has refractive power that is rotationally asymmetrical with respect to an optical axis. Patent Document 4 discloses a readout lens having a full angle of view of approximately 34 to 70 degrees, and which is composed of four elements. In Patent Document 4, a positive meniscus lens is arranged on the most object side. Patent Documents 5 discloses a readout lens having a full angle of view of approximately 80 degrees, and which is composed of six elements. The six elements are a negative lens, a positive lens, a negative lens, a positive lens, a positive lens, and a negative lens, which are arranged in this order from the object side.

As described above, it is desirable that various aberrations of imaging lenses for image readout apparatuses are corrected in an excellent manner. Further, it is desirable that the imaging lenses have high optical performance appropriate for imaging devices, the pixel numbers and the definition of which became higher in recent years. Further, low-cost imaging lenses that can further reduce the sizes of image readout apparatuses became requested in recent years. As a method for reducing the size of an image readout apparatus, a distance between a subject and an imaging surface of an imaging device may be minimized. However, for that purpose, the angle of view of the imaging lens needs to be extremely wide. Therefore, excellent correction of various aberrations, such as curvature of field, chromatic aberrations, and distortion, becomes difficult.

In all of the lens systems disclosed in Patent Documents 1 through 4, the full angles of view are approximately 60 to 70 degrees. The full angles of view are not sufficiently wide to reduce the sizes of the apparatuses to such an extent requested in recent years. Meanwhile, in the lens system disclosed in Patent Document 5, the full angle of view is approximately 80 degrees. However, the total length of the optical system is rather long. Further, since the lens system disclosed in Patent Document 5 uses an aspheric lens, the optical system is cost-disadvantageous, compared with an optical system composed of only spherical lenses.

SUMMARY OF THE INVENTION

In view of the foregoing circumstances, it is an object of the present invention to provide a cost-advantageous imaging lens having high optical performance, and which has a sufficiently wide angle, and which can reduce the size of an apparatus in which the imaging lens is used. Further, it is another object of the present invention to provide an imaging apparatus in which the imaging lens is provided.

An imaging lens of the present invention is an imaging lens comprising:

a first lens that is a negative meniscus lens having a concave surface facing the image side of the imaging lens;

a second lens that is a positive lens having a convex surface facing the object side of the imaging lens;

a third lens that is a negative lens having a concave surface facing the image side;

a fourth lens that is a double-convex lens;

a fifth lens that is a negative meniscus lens having a concave surface facing the object side; and a sixth lens that is a negative lens, which are arranged in this order from the object side.

The phrase "a negative meniscus lens having a concave surface facing the image side" about the first lens, the phrase "a positive lens having a convex surface facing the object side" about the second lens, the phrase "a negative lens having a concave surface facing the image side" about the third lens, the phrase "a double-convex lens" about the fourth lens, the phrase "a negative meniscus lens having a concave surface facing the object side" about the fifth lens, and the phrase "a negative lens" about the sixth lens refer to paraxial regions when the lenses are aspheric lenses.

In the imaging lens of the present invention, it is desirable that one of the following Formulas (1) through (11), or an arbitrary combination thereof is satisfied:

$$1.65 < (N2+N3+N4)/3 \tag{1}$$

$$1.50 < (N1+N6)/2 < 1.66 \tag{2}$$

$$0.5 < f1/f56 < 1.5 \tag{3}$$

$$0.45 < Dp/f < 1.10 \tag{4}$$

$$0.7 < f2/f34 < 1.2 \tag{5}$$

$$0.20 < Dn/f < 0.70 \tag{6}$$

$$0 < v4 - v3 < 25 \tag{7}$$

$$1.65 < N5 \tag{8}$$

$$1.0 < R5im/R5ob < 3.0 \tag{9}$$

$$0.0 \leq f/|R2im| < 0.67 \tag{10}$$

and $$0.0 \leq f/|R3ob| < 0.67 \tag{11},$$

where

N1 is the refractive index of the first lens with respect to e-line,

N2 is the refractive index of the second lens with respect to e-line,

N3 is the refractive index of the third lens with respect to e-line,

N4 is the refractive index of the fourth lens with respect to e-line,

N5 is the refractive index of the fifth lens with respect to e-line,

N6 is the refractive index of the sixth lens with respect to e-line,

ν3 is the Abbe number of the third lens with respect to d-line,

ν4 is the Abbe number of the fourth lens with respect to d-line,

Dp is a distance, on an optical axis, between an object-side surface of the second lens and an image-side surface of the fourth lens, Dn is a distance, on an optical axis, between an image-side surface of the fourth lens and an image-side surface of the sixth lens, R-2$im$ is a radius of curvature of an image-side surface of the second lens, R3$ob$ is a radius of curvature of an object-side surface of the third lens, R5$ob$ is a radius of curvature of an object-side surface of the fifth lens, R5$im$ is a radius of curvature of an image-side surface of the fifth lens, f is the focal length of the entire system of the imaging lens with respect to e-line, f1 is the focal length of the first lens with respect to e-line, f2 is the focal length of the second lens with respect to e-line, f34 is the combined focal length of the third lens and the fourth lens with respect to e-line, and f56 is the combined focal length of the fifth lens and the sixth lens with respect to e-line.

With respect to the radius of curvature, a paraxial radius of curvature is used when a lens is an aspheric lens. Further, the sign (positive/negative) of the radius of curvature in Formula (9) is positive when a surface is convex toward the object side, and negative when a surface is convex toward the image side.

In the imaging lens of the present invention, the third lens and the fourth lens may be cemented together to form a cemented lens having positive refractive power as a whole.

Further, in the imaging lens of the present invention, the sixth lens may be a meniscus lens having a convex surface facing the image side.

An imaging apparatus of the present invention includes an imaging lens of the present invention.

In the present invention, the shape and the power of each lens are appropriately set in a lens system composed of six elements in minimum. Therefore, the imaging lens of the present invention is cost-advantageous, and achieves a sufficiently wide angle to reduce the size of an apparatus in which the imaging lens is used. Further, the imaging lens of the present invention has high optical performance appropriate for an imaging device, the pixel number and the definition of which became higher in recent years. Further, the present invention can provide an imaging apparatus including the imaging lens.

BRIEF DESCRIPTION OF THE DRAWINGS

FIG. 1 is a cross section illustrating the structure of an imaging lens according to an embodiment of the present invention and optical paths;

FIG. 2 is a cross section illustrating the structure of an imaging lens in Example 1 of the present invention and optical paths;

FIG. 3 is a cross section illustrating the structure of an imaging lens in Example 2 of the present invention and optical paths;

FIG. 4 is a cross section illustrating the structure of an imaging lens in Example 3 of the present invention and optical paths;

FIG. 5 is a cross section illustrating the structure of an imaging lens in Example 4 of the present invention and optical paths;

FIG. 6 is a cross section illustrating the structure of an imaging lens in Example 5 of the present invention and optical paths;

FIG. 7 is a cross section illustrating the structure of an imaging lens in Example 6 of the present invention and optical paths;

FIG. 8 is a cross section illustrating the structure of an imaging lens in Example 7 of the present invention and optical paths;

FIG. 9 is a cross section illustrating the structure of an imaging lens in Example 8 of the present invention and optical paths;

FIGS. 10A through 10K are diagrams illustrating aberrations of the imaging lens in Example 1 of the present invention;

FIGS. 11A through 11K are diagrams illustrating aberrations of the imaging lens in Example 2 of the present invention;

FIGS. 12A through 12K are diagrams illustrating aberrations of the imaging lens in Example 3 of the present invention;

FIGS. 13A through 13K are diagrams illustrating aberrations of the imaging lens in Example 4 of the present invention;

FIGS. 15A through 15K are diagrams illustrating aberrations of the imaging lens in Example 6 of the present invention;

FIGS. 16A through 16K are diagrams illustrating aberrations of the imaging lens in Example 7 of the present invention;

FIGS. 17A through 17K are diagrams illustrating aberrations of the imaging lens in Example 8 of the present invention;

FIG. 20 is a schematic diagram illustrating the structure of an image readout apparatus of an area sensor type according to an embodiment of the present invention.

DESCRIPTION OF THE PREFERRED EMBODIMENTS

Figure 13E:
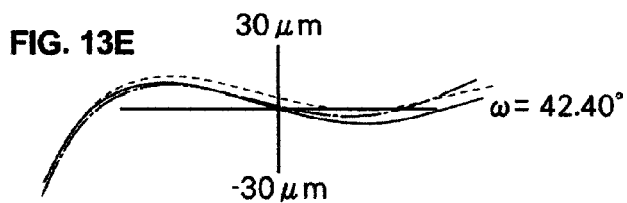
Figure 13I:
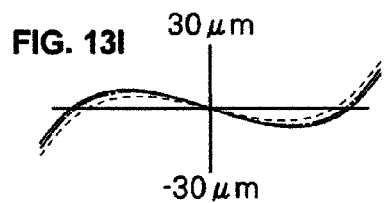
Figure 13F:
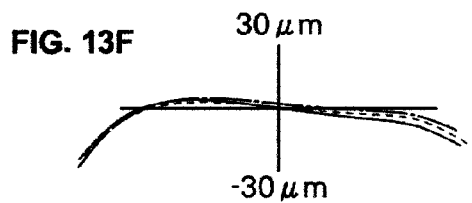
Figure 13J:
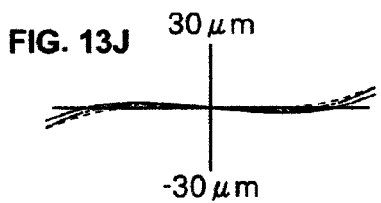
Figure 13G:
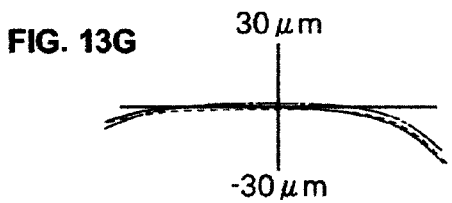
Figure 13K:
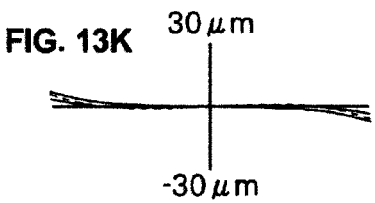
Figure 13H:
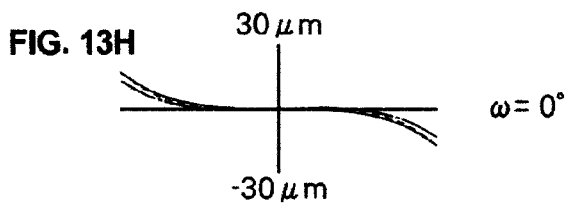
Figure 14A:
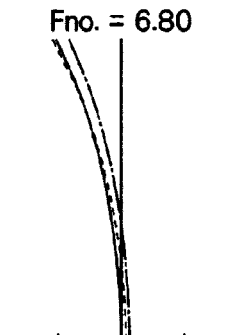
FIGS. 14A through 14K are diagrams illustrating aberrations of the imaging lens in Example 5 of the present invention.
Figure 14B:
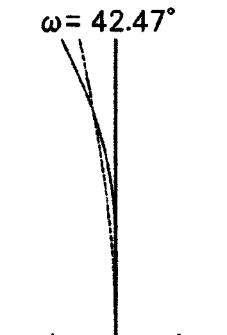
Figure 14C:
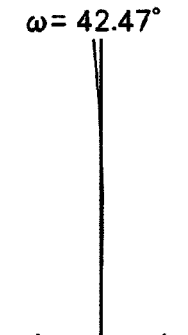
Figure 14D:
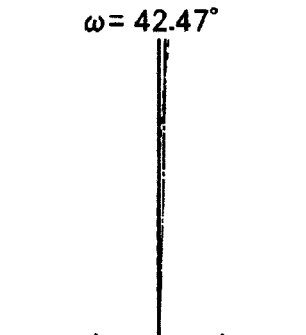
Figure 14E:
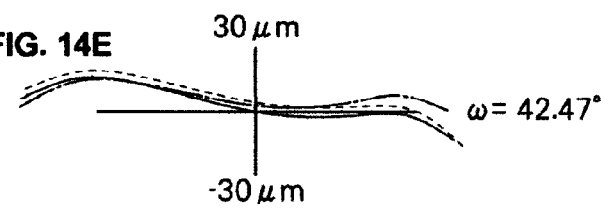
Figure 14I:
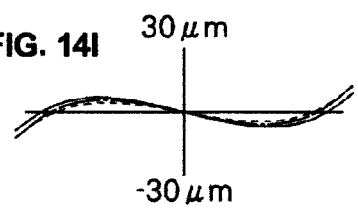
Figure 14F:
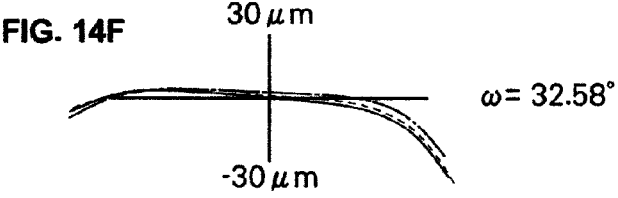
Figure 14J:
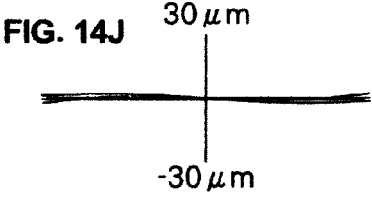
Figure 14G:
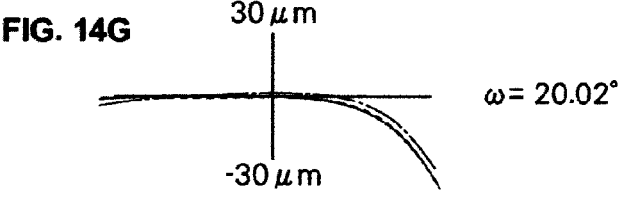
Figure 14K:
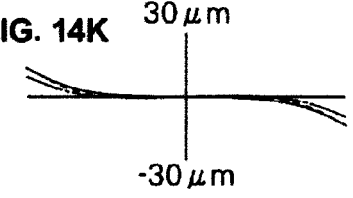
Figure 14H:
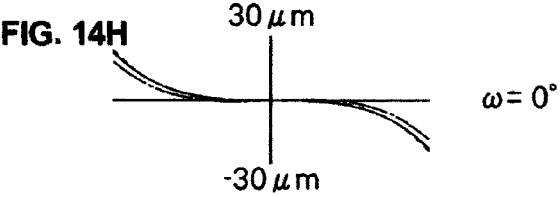

Hereinafter, embodiments of the present invention will be described with reference to drawings. First, with reference to FIG. 1, an imaging lens according to an embodiment of the present invention will be described. FIG. 1 is a cross section illustrating the structure of an imaging lens 1 according to an embodiment of the present invention and optical paths. The imaging lens 1 illustrated in FIG. 1 corresponds to an imaging lens in Example 3, which will be described later. In FIG. 1, the left side is the object side, and the right side is the image side. Axial rays 2 from an object located at a predetermined finite distance, and rays 3 at a maximum angle of view are also illustrated in FIG. 1.

As illustrated in FIG. 1, the imaging lens 1 includes first lens L1, second lens L2, third lens L3, fourth lens L4, fifth lens L5, and sixth lens L6, which are arranged along optical axis Z in this order from the object side. The first lens L1 is a negative meniscus lens having a concave surface facing the image side. The second lens L2 is a positive lens having a convex surface facing the object side. The third lens L3 is a negative lens having a concave surface facing the image side. The fourth lens L4 is a double-convex lens. The fifth lens L5 is a negative meniscus lens having a concave surface facing the object side. The sixth lens L6 is a negative lens.

The imaging lens 1 is appropriate as a readout lens of an image readout apparatus for reading out an image in an original. In the example illustrated in FIG. 1, parallel-flat-plate-shaped optical member P1, which is assumed to be a transparent original mounting member (a member on which an original is to be placed), is arranged on the object side of the imaging lens 1. Further, parallel-flat-plate-shaped optical member P2, which is assumed to be a filter, a cover glass or the like, is arranged on the image side of the imaging lens 1.

Further, in the example illustrated in FIG. 1, aperture stop St is arranged between the second lens L2 and the third lens L3. The aperture stop St illustrated in FIG. 1 does not necessarily represent the size nor the shape of the aperture stop, but a position at which the aperture stop is located on optical axis Z.

The imaging lens 1 can realize a wide angle, because the first lens L1, which is located on the most object side, and two lenses located on the most image side (fifth lens L5 and sixth lens L6) are negative lenses. In a wide-angle optical system, such as the imaging lens 1, it is desirable that the first lens L1 is a meniscus lens having a concave surface facing the image side, and that at least one of the two lenses located on the most image side is a meniscus lens having a concave surface facing the object side.

Accordingly, it is possible to reduce an angle between a ray passing through a surface of each of the meniscus lenses and a normal to the surface at a point at which the ray passes through the surface. Consequently, it is possible to prevent the angle of refraction of the ray passing through the surface from becoming large. In the wide-angle optical system, as described above, when rays pass through the most-object-side lens and the two most-image-side lenses, rays at a maximum angle of view and rays passing through the peripheral area of the lens in the vicinity of the maximum angle of view have large angles with respect to optical axis Z. When meniscus lenses are included as described above, it is possible to suppress coma aberrations generated in rays passing through the peripheral areas of the lenses, and which enter the surfaces at large angles with respect to optical axis Z.

Further, when the fifth lens L5 is a negative meniscus lens having a concave surface facing the object side, it is possible to suppress generation of aberrations. Specifically, when rays output from the fourth lens L4 enter the fifth lens L5, and are refracted, an angle between a ray entering the object-side surface of the fifth lens L5 and a normal to the surface at a point at which the ray passes through the surface is not large, compared with the case in which the object-side surface of the fifth lens L5 is a convex surface. Therefore, generation of aberrations is suppressed. Further, it is possible to achieve a wider angle, because the lens has negative refractive power.

The imaging lens 1 includes a lens having strong negative power to achieve a wider angle. Therefore, an element having strong positive power is needed to correct spherical aberrations and curvature of field in the entire system in an excellent manner. Therefore, the imaging lens 1 includes the positive second lens L2 having a convex surface facing the object side and the fourth lens L4, which is a double-convex lens. A lens group composed of the second lens L2 through the fourth lens L4 (second lens L2, third lens L3, and fourth lens L4 in the example illustrated in FIG. 1) has strong positive power. In this lens group, the image-side surface of the third lens L3 is a concave surface facing the image side, and the object-side surface of the fourth lens L4 is a convex surface facing the object side. Therefore, it is possible to increase the magnitude of divergence as the angle of view becomes larger. Even when the lens group composed of the second lens L2 through the fourth lens L4 has strong positive power, it is possible to prevent under-correction of curvature of field at a maximum angle of view and in the vicinity thereof. Therefore, it is possible to correct curvature of field in an excellent manner.

The imaging lens 1, which is structured as described above, can realize a high-resolution optical system in which various aberrations are corrected in an excellent manner, while achieving a wide angle. Further, the imaging lens 1 may be structured in such a manner to include no aspheric surface, as in the example illustrated in FIG. 1. When all of lens surfaces are spherical, it is possible to reduce the cost.

It is desirable that the image-side surface of the second lens L2 is a flat surface or a convex surface having a large absolute value of radius of curvature. The object-side surface of the third lens L3 may be a flat surface or a convex surface having a large absolute value of radius of curvature.

When the shape of the second lens L2 and the shape of the third lens L3 are set as described above, it is possible to extend the shapes of areas of the image-side surface of the second lens L2 and the object-side surface of the third lens L3, through which rays contributing to image formation pass, to peripheral areas of the lenses, respectively. Further, a spacer ring used in assembly of the lenses may be placed in contact with the extended portions. Therefore, it is possible to minimize the influence of errors caused in processing of the lenses and the spacer ring, and to ensure stable performance of the imaging lens 1. When the surfaces of the lenses are flat, it is possible to produce the lenses at low cost.

When the image-side surface of the second lens L2 is flat, it is desirable that the object-side surface of the third lens L3 is flat to reduce the size of the optical system in the direction of the optical axis. When the image-side surface of the second lens L2 is convex, it is desirable that the object-side surface of the third lens L3 is concave to reduce the size of the optical system in the direction of the optical axis. When the object-side surface of the third lens L3 is a concave surface, the third lens L3 is a double-concave lens, and that is advantageous to excellent correction of various aberrations.

The third lens L3 and the fourth lens L4 may form a cemented lens. Alternatively, the third lens L3 and the fourth lens L4 may be separate lenses, which are not cemented together. It is desirable that the third lens L3 and the fourth lens L4 are not cemented together to increase the flexibility of design. However, it is desirable that the third lens L3 and the fourth lens L4 are cemented together to correct chromatic aberrations in an excellent manner and to reduce the size of the optical system in the direction of the optical axis. Further, when the third lens L3 and the fourth lens L4 are cemented together, a spacer ring for holding the two lenses is not needed. Further, it is possible to prevent a deterioration in the performance of the lens system caused by eccentricities of the third lens L3 and the fourth lens L4 relative to each other. Therefore, it is possible to improve the assembly characteristic, and to suppress a variance in performance. Hence, the cemented lens is cost-advantageous.

When the third lens L3 and the fourth lens L4 are cemented together, it is desirable that the lens group composed of the second lens L2 through the fourth lens L4 has strong positive power, as described above. Therefore, it is desirable that the cemented lens composed of the third lens L3 and the fourth lens L4 has positive refractive power as a whole.

The six lens L6 may be any one of a double-concave lens, a negative meniscus lens having a convex surface facing the object side, and a negative meniscus lens having a convex surface facing the image side. Especially, when the six lens L6 is a negative meniscus lens having a convex surface facing the image side, it is possible to suppress coma flare in an peripheral area of an image and a variation in lateral chromatic aberrations depending on colors. Such advantageous effects are achievable, because when axial rays and rays included in off-axial rays at respective angles of view enter the sixth lens L6 or are output from the sixth lens L6, it is possible to make an angle between each of the rays and a normal to respective surfaces of the sixth lens L6 at a point at which the rays pass through the respective surfaces of the sixth lens L6 small. When the sixth lens L6 is a negative meniscus lens having a convex surface facing the image side, it is possible to make a deterioration in performance caused by production errors, such as an inclination of a lens and axial misalignment during setting of the lens in a lens frame, relatively small.

It is not necessary that the aperture stop St is located at the position illustrated in FIG. 1. However, it is desirable that the aperture stop St is located in the vicinity of one of the second lens L2, the third lens L3 and the fourth lens L4 to reduce the size of the optical system in the direction of the diameter of the optical system and to improve the symmetricalness of the optical system. Specifically, it is desirable that the aperture stop St is arranged between the second lens L2 and the third lens L3, or between the third lens L3 and the fourth lens L4. It is more desirable that the aperture stop St is arranged between the second lens L2 and the third lens L3.

When the reduction of the size of the optical system is important, it is desirable that the imaging lens of the present invention is composed of six lenses of the first lens L1 through the sixth lens L6, as described above. However, when an improvement of performance of the optical system is important, more lens or lenses may be used in addition to the six lenses.

All of surfaces of the lenses in the imaging lens of the present invention may be spherical, as illustrated in FIG. 1. However, when low cost is not so important, the imaging lens of the present invention may include an aspheric surface or surfaces. In that case, the flexibility in design is increased, and higher optical performance is achievable.

Next, Formulas (1) through (11) and the actions and effects thereof will be described. It is desirable that the imaging lens 1 according to an embodiment of the present invention satisfies the Formulas (1) through (11). In the embodiment of the present invention, one of the Formulas (1) through (11), or an arbitrary combination of Formulas (1) through (11) may be satisfied:

$$1.65 < (N2+N3+N4)/3 \quad (1);$$

$$1.50 < (N1+N6)/2 < 1.66 \quad (2);$$

$$0.5 < f1/f56 < 1.5 \quad (3);$$

$$0.45 < Dp/f < 1.10 \quad (4);$$

$$0.7 < f2/f34 < 1.2 \quad (5);$$

$$0.20 < Dn/f < 0.70 \quad (6);$$

$$0 < \nu4 - \nu3 < 25 \quad (7);$$

$$1.65 < N5 \quad (8);$$

$$1.0 < R5im/R5ob < 3.0 \quad (9);$$

$$0.0 \leq f/|R2im| < 0.67 \quad (10);$$

and $$0.0 \leq f/|R3ob| < 0.67 \quad (11),$$

where

N1 is the refractive index of the first lens L1 with respect to e-line,

N2 is the refractive index of the second lens L2 with respect to e-line,

N3 is the refractive index of the third lens L3 with respect to e-line,

N4 is the refractive index of the fourth lens L4 with respect to e-line,

N5 is the refractive index of the fifth lens L5 with respect to e-line,

N6 is the refractive index of the sixth lens L6 with respect to e-line,

ν3 is the Abbe number of the third lens L3 with respect to d-line,

ν4 is the Abbe number of the fourth lens L4 with respect to d-line,

Dp is a distance, on an optical axis, between an object-side surface of the second lens L2 and an image-side surface of the fourth lens L4, Dn is a distance, on an optical axis, between an image-side surface of the fourth lens L4 and an image-side surface of the sixth lens L6, R2im is a radius of curvature of an image-side surface of the second lens L2, R3ob is a radius of curvature of an object-side surface of the third lens L3, R5ob is a radius of curvature of an object-side surface of the fifth lens L5, R5im is a radius of curvature of an image-side surface of the fifth lens L5, f is the focal length of the entire system of the imaging lens with respect to e-line, f1 is the focal length of the first lens L1 with respect to e-line, f2 is the focal length of the second lens L2 with respect to e-line, f34 is the combined focal length of the third lens L3 and the fourth lens L4 with respect to e-line, and f56 is the combined focal length of the fifth lens L5 and the sixth lens L6 with respect to e-line.

The Formula (1) defines a condition for correcting curvature of field and coma aberration in an excellent manner. When the value of (N2+N3+N4)/3 is lower than the lower limit defined by the Formula (1), the absolute value of the radius of curvature of the most-object-side surface in the positive lens group composed of the second lens L2 through the fourth lens L4 and the absolute value of the radius of curvature of the most-image-side surface in the positive lens group become small. That causes generation of high-order coma aberration at a maximum angle of view and in the vicinity thereof. When the material of the second lens L2 through the fourth lens L4 is selected to satisfy the Formula (1), the absolute values of the radii of curvature become relatively large, and the positive Petzval value of the positive lens group becomes small. Therefore, it is possible to correct aberrations in an excellent manner, while suppressing curvature of field.

Generally, a plastic material has a lower refractive index than a glass material. Therefore, it is desirable that at least one of the second lens L2 through the fourth lens L4 is made of glass. It is more desirable that all of the second lens L2 through the fourth lens L4 are made of glass.

The Formula (2) defines a condition for correcting coma aberration, distortion and curvature of field in an excellent manner. When the value of (N1+N6)/2 is lower than the lower limit defined by the Formula (2), the absolute value of the radius of curvature of the first lens L1 and the absolute value of the radius of curvature of the sixth lens L6 become too small. That causes generation of high-order coma aberration, and an increase in positive distortion. When the value of (N1+N6)/2 exceeds the upper limit defined by the Formula (2), the absolute value of the radius of curvature of the first lens L1 and the absolute value of the radius of curvature of the sixth lens L6 become relatively large, and the absolute values of the negative Petzval values of the two negative lenses do not become large. The negative Petzval values of the two negative lenses are insufficient to offset the positive Petzval value of the positive lens group composed of the second lens L2 through the fourth lens L4. Consequently, excellent correction of curvature of field becomes difficult.

As a material satisfying the Formula (2), for example, a plastic material may be used. It is desirable that at least one of the first lens L1, the fifth lens L5 and the sixth lens L6 is an aspheric lens to obtain higher performance by correcting aberrations in a more excellent manner. In the first lens L1, the fifth lens L5 and the sixth lens L6, rays at each image height are separated at least in a predetermined degree. When an aspheric lens or lenses are used, it is desirable that the material of the aspheric lens or lenses is a plastic material, because plastic is easily shapable.

The Formula (3) defines a condition for correcting off-axial aberrations in an excellent manner by improving the symmetricalness of the optical system. When the Formula (3) is satisfied, the symmetricalness of the power arrangement of the lens system can be improved. Especially, when the aperture stop St is arranged at a desirable position as described above, if the lens system is structured to satisfy the Formula (3), the arrangement of power is substantially symmetrical with respect to the aperture stop St. Therefore, it is possible to correct aberrations, such as lateral chromatic aberration, distortion and curvature of field, relatively easily. When the value of f1/f56 exceeds the upper limit defined by the Formula (3) or is lower than the lower limit defined by the Formula (3), these aberrations become large, and it becomes difficult to obtain high performance.

The Formula (4) defines a condition for making the lens system compact, while correcting curvature of field and coma aberrations in an excellent manner. When the Formula (4) is satisfied, the positive lens group composed of the second lens L2 through the fourth lens L4 has appropriate power. When the value of Dp/f is lower than the lower limit defined by the Formula (4), the distance (length), in the direction of the optical axis, of the positive lens group composed of the second lens L2 through the fourth lens L4 becomes short. Since this positive lens group with a short length needs to have strong convergence action to form an image on image plane Sim, the absolute value of the radius of curvature of the most-object-side surface of the positive lens group and the absolute value of the radius of curvature of the most-image-side surface of the positive lens group become small. That causes generation of high-order coma aberration at a maximum angle of view and in the vicinity thereof.

When the value of Dp/f exceeds the upper limit defined by the Formula (4), the absolute value of the radius of curvature of the most-object-side surface of the positive lens group and the absolute value of the radius of curvature of the most-image-side surface of the positive lens group become large. Further, the absolute value of the radius of curvature of the following negative lens group located on the image side of the positive lens group also becomes large. Therefore, the total length of the negative lens group also becomes long to obtain divergence action needed by the negative lens group. That is disadvantageous to making the optical system compact.

The Formula (5) defines a condition for correcting off-axial aberrations in an excellent manner by improving the symmetricalness of the optical system. When the lens system is structured so as to satisfy the Formula (5), it is possible to improve the symmetricalness of the arrangement of power of the lens system. As described above, it is desirable that the aperture stop St is arranged between the second lens L2 and the third lens L3. When the aperture stop St is arranged at the position, if the Formula (5) is satisfied, the arrangement of power is substantially symmetrical with respect to the aperture stop St. Therefore, it is possible to correct aberrations, such as lateral chromatic aberration, distortion and curvature of field, relatively easily. When the value of f2/f34 exceeds the upper limit defined by the Formula (5) or is lower than the lower limit defined by the Formula (5), these aberrations become large, and it becomes difficult to obtain high performance.

The Formula (6) defines a condition for making the lens system compact, while correcting curvature of field and coma aberrations in an excellent manner. When the Formula (6) is satisfied, a negative lens group composed of negative lenses on the image side of the fourth lens L4 has appropriate power. When the value of Dn/f is lower the lower limit defined by the Formula (6), a distance (length), in the direction of the optical axis, of the negative lens group on the image side of the fourth lens L4 becomes short. Since the negative lens group with a short length needs to have strong divergence action to form an image on image plane Sim in a wide-angle optical system, the absolute value of the radius of curvature of the most-object-side surface of the negative lens group and the absolute value of the radius of curvature of the most-image-side surface of the negative lens group become small. That causes generation of high-order coma aberration at a maximum angle of view and in the vicinity thereof.

When the value of Dn/f exceeds the upper limit defined by the Formula (6), the absolute value of the radius of curvature of the negative lens group becomes large, and the total length of the negative lens group also becomes long to obtain divergence action needed by the negative lens group. That is disadvantageous to making the optical system compact.

The Formula (7) defines a condition for correcting chromatic aberrations in an excellent manner. When the materials of the negative third lens L3 and the positive fourth lens L4, which are next to each other, are selected so as to satisfy the Formula (7), it is possible to correct chromatic aberrations in an excellent manner.

The Formula (8) defines a condition for correcting curvature of field in an excellent manner. To achieve a wide angle, the fifth lens L5 needs to strongly refract, in a direction away from optical axis Z, rays of light converged by the positive lens group composed of the second lens L2 through the fourth lens L4 on the object side of the fifth lens L5. Therefore, it is desirable that a material satisfying the Formula (8) is selected to prevent the absolute value of the radius of curvature of the fifth lens L5 from becoming small, and to prevent an increase of high-order coma aberration.

The Formula (9) defines a condition for correcting curvature of field in an excellent manner. When a difference between the radius of curvature of the object-side surface of the fifth lens L5 and the radius of curvature of the image-side surface of the fifth lens L5 is small, the Petzval value becomes small.

The Formula (10) defines a condition for suppressing generation of high-order coma aberration at a maximum angle of view and in the vicinity thereof. When the image-side surface of the second lens L2 is formed so as to satisfy the Formula (10), it is possible to prevent an angle between each of rays at a maximum angle of view and in the vicinity thereof and a normal to the image-side surface of the second lens L2 at a point at which the respective rays pass through the image-side surface of the second lens L2 from becoming large. Therefore, it is possible to suppress generation of high-order coma aberrations.

The Formula (11) defines a condition for suppressing generation of high-order coma aberration at a maximum angle of view and in the vicinity thereof. When the object-side surface of the third lens L3 is formed to satisfy the Formula (11), it is possible to prevent an angle between each of rays at a maximum angle of view and in the vicinity thereof and a normal to the object-side surface of the third lens L3 at a point at which the respective rays pass through the object-side surface of the third lens L3 from becoming large. Therefore, it is possible to suppress generation of high-order coma aberrations.

Further, it is more desirable that the imaging lens 1 satisfies one of the following Formulas (1-1) through (9-1), or an arbitrary combination of Formulas (1-1) through (9-1). When the Formulas (I-1) through (9-1) are satisfied instead of the Formulas (1) through (9), respectively, it is possible to increase the advantageous effect achievable by satisfying the Formulas (1) through (9):

$$1.69 < (N2+N3+N4)/3 \quad (1\text{-}1);$$

$$1.52 < (N1+N6)/2 < 1.64 \quad (2\text{-}1);$$

$$0.8 < f1/f56 < 1.3 \quad (3\text{-}1);$$

$$0.50 < Dp/f < 0.95 \quad (4\text{-}1);$$

$$0.9 < f2/f34 < 1.1 \quad (5\text{-}1);$$

$$0.30 < Dn/f < 0.65 \quad (6\text{-}1);$$

$$7 < v4-v3 < 25 \quad (7\text{-}1);$$

$$1.68 < N5 \quad (8\text{-}1);$$

and $$1.4 < R5im/R5ob < 2.6 \quad (9\text{-}1).$$

Next, numerical examples of the imaging lens of the present invention will be described. FIGS. 2 through 9 are cross sections of imaging lenses in Examples 1 through 8 of the present invention. In FIGS. 2 through 9, the left side is the object side, and the right side is the image side in a manner similar to FIG. 1. Further, axial rays 2 from an object located at a predetermined finite distance, rays 3 at a maximum angle of view, optical member P1, and optical member P2 are also illustrated. Aperture stop St illustrated in these drawings does not necessarily represent the size nor the shape of the aperture stop, but a position at which the aperture stop is located on optical axis Z.

Tables 1 through 8 show lens data about the imaging lenses in Examples 1 through 8. In the tables, effective F-number, the focal length of the entire system, and a full angle of view are also shown.

TABLE 1

EXAMPLE 1
LENS DATA

| Si | Ri | Di | Nej | vdj |
|---|---|---|---|---|
| 1 | ∞ | 114.9748 | | |
| 2 | ∞ | 2.8000 | 1.51872 | 64.20 |
| 3 | ∞ | 0.0000 | | |
| 4 | 13.7184 | 0.8000 | 1.59911 | 39.24 |
| 5 | 3.1267 | 0.5400 | | |
| 6 | 4.2666 | 3.5000 | 1.77621 | 49.60 |
| 7 | 25.1023 | 0.2320 | | |
| 8(APERTURE STOP) | ∞ | 0.0500 | | |
| 9 | −48.2942 | 0.7500 | 1.83932 | 37.16 |
| 10 | 15.6969 | 0.1000 | | |
| 11 | 13.9497 | 2.5200 | 1.73234 | 54.68 |
| 12 | −5.0097 | 2.4400 | | |
| 13 | −3.6133 | 1.4200 | 1.81264 | 25.42 |
| 14 | −6.2483 | 0.1500 | | |
| 15 | −74.3446 | 0.7000 | 1.51872 | 64.20 |
| 16 | 66.6152 | 0.5000 | | |
| 17 | ∞ | 0.3000 | 1.51872 | 64.20 |
| 18 | ∞ | 8.5588 | | |
| 19 | ∞ | | | |

Effective F-Number 6.76
Focal Length 13.458
Full Angle of View 84.21

TABLE 2

EXAMPLE 2
LENS DATA

| Si | Ri | Di | Nej | vdj |
|---|---|---|---|---|
| 1 | ∞ | 113.4487 | | |
| 2 | ∞ | 2.8000 | 1.51872 | 64.20 |
| 3 | ∞ | 0.0000 | | |
| 4 | 13.9887 | 0.8000 | 1.59911 | 39.24 |
| 5 | 3.7643 | 1.0000 | | |
| 6 | 4.9918 | 4.2000 | 1.77621 | 49.60 |
| 7 | 42.8380 | 0.1400 | | |
| 8(APERTURE STOP) | ∞ | 0.0500 | | |
| 9 | −57.3591 | 1.0600 | 1.72407 | 41.98 |
| 10 | 4.0888 | 3.4100 | 1.77621 | 49.60 |
| 11 | −6.7848 | 2.3200 | | |
| 12 | −3.6793 | 2.0300 | 1.81264 | 25.42 |
| 13 | −7.1474 | 0.1500 | | |
| 14 | 125.7604 | 0.7000 | 1.51872 | 64.20 |
| 15 | 53.5465 | 1.0000 | | |
| 16 | ∞ | 0.3000 | 1.51872 | 64.20 |
| 17 | ∞ | 6.7569 | | |
| 18 | ∞ | | | |

Effective F-Number 6.77
Focal Length 13.347
Full Angle of View 84.66

TABLE 3

EXAMPLE 3
LENS DATA

| Si | Ri | Di | Nej | vdj |
|---|---|---|---|---|
| 1 | ∞ | 111.8171 | | |
| 2 | ∞ | 2.8000 | 1.51872 | 64.20 |
| 3 | ∞ | 0.0000 | | |
| 4 | 17.2345 | 3.2400 | 1.54344 | 47.23 |
| 5 | 3.2985 | 0.8700 | | |
| 6 | 5.3614 | 3.7300 | 1.77621 | 49.60 |
| 7 | ∞ | 0.0000 | | |
| 8(APERTURE STOP) | ∞ | 0.0530 | | |
| 9 | ∞ | 0.9500 | 1.85649 | 32.27 |
| 10 | 6.9639 | 3.5900 | 1.75844 | 52.32 |
| 11 | −4.9713 | 2.0100 | | |
| 12 | −4.0049 | 1.9000 | 1.70442 | 30.13 |
| 13 | −7.5812 | 1.0000 | | |
| 14 | −5.4850 | 0.9100 | 1.59143 | 61.14 |
| 15 | −10.1229 | 0.0000 | | |
| 16 | ∞ | 0.7000 | 1.51872 | 64.20 |
| 17 | ∞ | 6.8629 | | |
| 18 | ∞ | | | |

Effective F-Number 6.79
Focal Length 13.095
Full Angle of View 84.87

TABLE 4

EXAMPLE 4
LENS DATA

| Si | Ri | Di | Nej | vdj |
|---|---|---|---|---|
| 1 | ∞ | 112.2729 | | |
| 2 | ∞ | 2.8000 | 1.51872 | 64.20 |
| 3 | ∞ | 0.0000 | | |
| 4 | 15.0840 | 2.4000 | 1.59911 | 39.24 |
| 5 | 3.4354 | 0.8800 | | |
| 6 | 5.3795 | 4.3200 | 1.79012 | 44.20 |
| 7 | ∞ | 0.0000 | | |
| 8(APERTURE STOP) | ∞ | 0.0490 | | |
| 9 | ∞ | 0.9000 | 1.85649 | 32.27 |
| 10 | 6.6352 | 3.3700 | 1.77621 | 49.60 |
| 11 | −5.4718 | 2.5000 | | |
| 12 | −4.0609 | 2.0800 | 1.81264 | 25.42 |
| 13 | −7.5250 | 0.6400 | | |
| 14 | −6.1644 | 0.9000 | 1.51872 | 64.20 |
| 15 | −11.2289 | 0.0000 | | |
| 16 | ∞ | 0.7000 | 1.51872 | 64.20 |
| 17 | ∞ | 6.7009 | | |
| 18 | ∞ | | | |

Effective F-Number 6.82
Focal Length 13.248
Full Angle of View 84.99

TABLE 5

EXAMPLE 5
LENS DATA

| Si | Ri | Di | Nej | vdj |
|---|---|---|---|---|
| 1 | ∞ | 112.6268 | | |
| 2 | ∞ | 2.8000 | 1.51872 | 64.20 |
| 3 | ∞ | 0.0000 | | |
| 4 | 17.0870 | 2.1800 | 1.53430 | 48.83 |
| 5 | 3.3151 | 0.7400 | | |
| 6 | 5.1528 | 3.6500 | 1.77621 | 49.60 |
| 7 | ∞ | 0.0000 | | |
| 8(APERTURE STOP) | ∞ | 0.0500 | | |
| 9 | ∞ | 0.8000 | 1.85649 | 32.27 |
| 10 | 8.5290 | 3.8000 | 1.75844 | 52.32 |
| 11 | −5.0040 | 2.1000 | | |
| 12 | −3.9432 | 2.7500 | 1.81264 | 25.42 |
| 13 | −7.8377 | 1.0200 | | |
| 14 | −6.0192 | 0.8700 | 1.56606 | 60.67 |
| 15 | −11.4885 | 0.0000 | | |
| 16 | ∞ | 0.7000 | 1.51872 | 64.20 |
| 17 | ∞ | 6.0079 | | |
| 18 | ∞ | | | |

Effective F-Number 6.80
Focal Length 13.067
Full Angle of View 84.94

TABLE 6

EXAMPLE 6
LENS DATA

| Si | Ri | Di | Nej | vdj |
|---|---|---|---|---|
| 1 | ∞ | 110.7458 | | |
| 2 | ∞ | 2.8000 | 1.51872 | 64.20 |
| 3 | ∞ | 0.0000 | | |
| 4 | 19.7492 | 3.0000 | 1.54846 | 46.50 |
| 5 | 3.3150 | 0.8100 | | |
| 6 | 6.5628 | 4.1200 | 1.77621 | 49.60 |
| 7 | ∞ | 0.0000 | | |
| 8(APERTURE STOP) | ∞ | 0.0500 | | |
| 9 | ∞ | 0.8500 | 1.85649 | 32.27 |
| 10 | 7.2411 | 3.4100 | 1.69979 | 55.50 |
| 11 | −5.2272 | 4.8800 | | |
| 12 | −4.9314 | 0.6500 | 1.70412 | 32.90 |
| 13 | −7.6031 | 0.8200 | | |
| 14 | −6.1224 | 0.9000 | 1.51825 | 64.10 |
| 15 | −10.7163 | 0.0000 | | |
| 16 | ∞ | 0.7000 | 1.51872 | 64.20 |
| 17 | ∞ | 6.2384 | | |
| 18 | ∞ | | | |

Effective F-Number 6.78
Focal Length 12.958
Full Angle of View 85.55

TABLE 7

EXAMPLE 7
LENS DATA

| Si | Ri | Di | Nej | vdj |
|---|---|---|---|---|
| 1 | ∞ | 112.7818 | | |
| 2 | ∞ | 2.8000 | 1.51872 | 64.20 |
| 3 | ∞ | 0.0000 | | |
| 4 | 17.7073 | 1.7900 | 1.54344 | 47.20 |
| 5 | 3.4444 | 0.8000 | | |
| 6 | 4.8090 | 3.4900 | 1.81711 | 41.50 |
| 7 | ∞ | 0.0000 | | |
| 8(APERTURE STOP) | ∞ | 0.0520 | | |
| 9 | ∞ | 0.8500 | 1.85649 | 32.27 |
| 10 | 5.4447 | 4.0500 | 1.80811 | 46.60 |
| 11 | −4.8487 | 1.1700 | | |
| 12 | −3.7409 | 4.2900 | 1.85504 | 23.80 |
| 13 | −9.2364 | 1.2900 | | |
| 14 | −6.4346 | 0.9000 | 1.51825 | 64.10 |
| 15 | −14.7598 | 0.0000 | | |
| 16 | ∞ | 0.7000 | 1.51872 | 64.20 |
| 17 | ∞ | 5.2251 | | |
| 18 | ∞ | | | |

Effective F-Number 6.78
Focal Length 13.027
Full Angle of View 85.04

TABLE 8

EXAMPLE 8
LENS DATA

| Si | Ri | Di | Nej | vdj |
|---|---|---|---|---|
| 1 | ∞ | 111.2216 | | |
| 2 | ∞ | 2.0000 | 1.51872 | 64.20 |
| 3 | ∞ | 0.0000 | | |
| 4 | 29.1139 | 0.9000 | 1.59911 | 47.20 |
| 5 | 5.1382 | 1.5851 | | |
| 6 | 7.2199 | 4.4043 | 1.72708 | 41.50 |
| 7 | −38.8607 | 0.6307 | | |
| 8(APERTURE STOP) | ∞ | 0.1957 | | |
| 9 | −23.9207 | 0.7100 | 1.61170 | 32.27 |
| 10 | 6.8187 | 5.8832 | 1.77621 | 46.60 |
| 11 | −6.8187 | 1.7255 | | |
| 12 | −5.2327 | 0.8000 | 1.85503 | 23.80 |
| 13 | −8.6033 | 3.0991 | | |
| 14 | −5.6818 | 0.9500 | 1.66630 | 64.10 |
| 15 | −10.3843 | 0.0000 | | |
| 16 | ∞ | 0.7000 | 1.51872 | 64.20 |
| 17 | ∞ | 5.2094 | | |
| 18 | ∞ | | | |

Effective F-Number  6.78
Focal Length  12.800
Full Angle of View  85.67

In the lens data of each table, the column of Si shows surface numbers of optical elements from an object plane through an image plane. The object plane is a first surface, and the surface numbers sequentially increase toward the image side. The lens data include aperture stop St and optical members P1 and P2. In a row corresponding to the aperture stop St, the term "(APERTURE STOP)" is written after the surface number.

Further, the column of Ri shows the radius of curvature of the i-th surface, and the column of Di shows a distance (space) between the i-th surface and the (i+1)th surface on optical axis Z. The column of Nej shows the refractive index of a j-th optical element (j=1, 2, 3, . . . ) with respect to e-line (wavelength is 546.07 nm). The most-object-side lens is the first optical element, and the value of j sequentially increases toward the image side. The column of vdj shows the Abbe number of the j-th optical element with respect to d-line. The sign (positive or negative) of the radius of curvature is positive when a surface is convex toward the object side, and negative when a surface is convex toward the image side.

Table 9 shows values corresponding to the Formulas (1) through (11) in the imaging lenses of Examples 1 through 8. All of Examples 1 through 8 satisfy the Formulas (1) through (11).

In Tables 1 through 9, values are rounded to a predetermined decimal place. In Tables 1 through 9, the unit of length is "mm", and the unit of angles is "degree". However, these units are only examples. Since an optical system is usable by being proportionally enlarged or reduced, other appropriate units may be adopted.

FIGS. 10A through 10K are diagrams illustrating aberrations of the imaging lens in Example 1. FIGS. 10A, 10B, 10C and 10D are diagrams illustrating spherical aberration, astigmatism, distortion and lateral chromatic aberration, respectively. FIGS. 10E through 10K are diagrams illustrating transverse aberration at each angle of view. The sign "Fno." in the diagram illustrating spherical aberration represents an effective F-number. In the other diagrams, the sign "ω" represents a half angle of view. In the diagrams illustrating spherical aberration, lateral chromatic aberration and transverse aberrations, aberrations with respect to e-line (wavelength is 546.07 nm) are indicated by solid lines. Further, aberrations with respect to g-line (wavelength is 435.84 nm) are indicated by broken lines, and aberrations with respect to C-line (wavelength is 656.27 nm) are indicated by dot-dashed lines. The diagrams illustrating astigmatism and distortion illustrate aberrations with respect to e-line. In the diagram illustrating astigmatism, aberrations in a sagittal direction are indicated by a solid line, and aberrations in a tangential direction are indicated by a dotted line.

FIGS. 10E through 10H are diagrams illustrating transverse aberrations in a tangential direction, and FIGS. 10I through 10K are diagrams illustrating transverse aberrations in a sagittal direction. The diagrams illustrating transverse aberrations in the tangential direction and the diagrams illustrating transverse aberrations in the sagittal direction at the same angle of view are arranged next to each other in the horizontal direction. When the angle of view is 0 degree, which corresponds an optical axis, a transverse aberration in a tangential direction and a transverse aberration in a sagittal direction are the same. Therefore, a diagram illustrating the transverse aberration in the sagittal direction on the optical axis is omitted.

Similarly, FIGS. 11A through 11K, FIGS. 12A through 12K, FIGS. 13A through 13K, FIGS. 14A through 14K, FIGS. 15A through 15K, FIGS. 16A through 16K, and FIGS. 17A through 17K are diagrams illustrating aberrations of imaging lenses in Examples 2 through 8, respectively.

The imaging lenses in Examples 1 through 8 are six-element optical systems including only spherical lenses. Therefore, the imaging lenses are very compact, and the cost for

TABLE 9

| FOMULA | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| (1) (N2 + N3 + N4)/3 | 1.78 | 1.76 | 1.80 | 1.81 | 1.80 | 1.78 | 1.83 | 1.70 |
| (2) (N1 + N6)/2 | 1.56 | 1.56 | 1.57 | 1.56 | 1.55 | 1.53 | 1.53 | 1.63 |
| (3) f1/f56 | 0.62 | 0.77 | 0.98 | 0.89 | 1.03 | 0.63 | 1.29 | 1.22 |
| (4) Dp/f | 0.53 | 0.66 | 0.64 | 0.65 | 0.64 | 0.65 | 0.65 | 0.92 |
| (5) f2/f34 | 0.83 | 0.80 | 0.99 | 0.91 | 0.95 | 1.00 | 0.95 | 1.00 |
| (6) Dn/f | 0.35 | 0.39 | 0.44 | 0.46 | 0.52 | 0.56 | 0.59 | 0.51 |
| (7) v4 − v3 | 18 | 8 | 20 | 17 | 20 | 23 | 14 | 11 |
| (8) N5 | 1.81 | 1.81 | 1.70 | 1.81 | 1.81 | 1.70 | 1.86 | 1.86 |
| (9) R5im/R5ob | 1.73 | 1.94 | 1.89 | 1.85 | 1.99 | 1.54 | 2.47 | 1.64 |
| (10) f/|R2im| | 0.54 | 0.31 | 0.0 | 0.0 | 0.0 | 0.0 | 0.0 | 0.33 |
| (11) f/|R3ob| | 0.28 | 0.23 | 0.0 | 0.0 | 0.0 | 0.0 | 0.0 | 0.54 |
| f1 | −6.96 | −8.86 | −8.18 | −8.05 | −8.15 | −7.77 | −8.23 | −10.56 |
| f2 | 6.17 | 6.94 | 6.91 | 6.81 | 6.64 | 8.45 | 5.89 | 8.73 |
| f34 | 7.46 | 8.66 | 7.00 | 7.52 | 6.95 | 8.47 | 6.21 | 8.74 |
| f56 | −11.14 | −11.58 | −8.31 | −9.02 | −7.91 | −12.38 | −6.37 | −8.63 | production is low. However, as the data in the tables and the diagrams show, the imaging lenses in Examples 1 through 8 achieve wide angles, namely, full angles of view of approximately 85°, and have high optical performance in which each aberration is corrected in an excellent manner.

Figure 18:
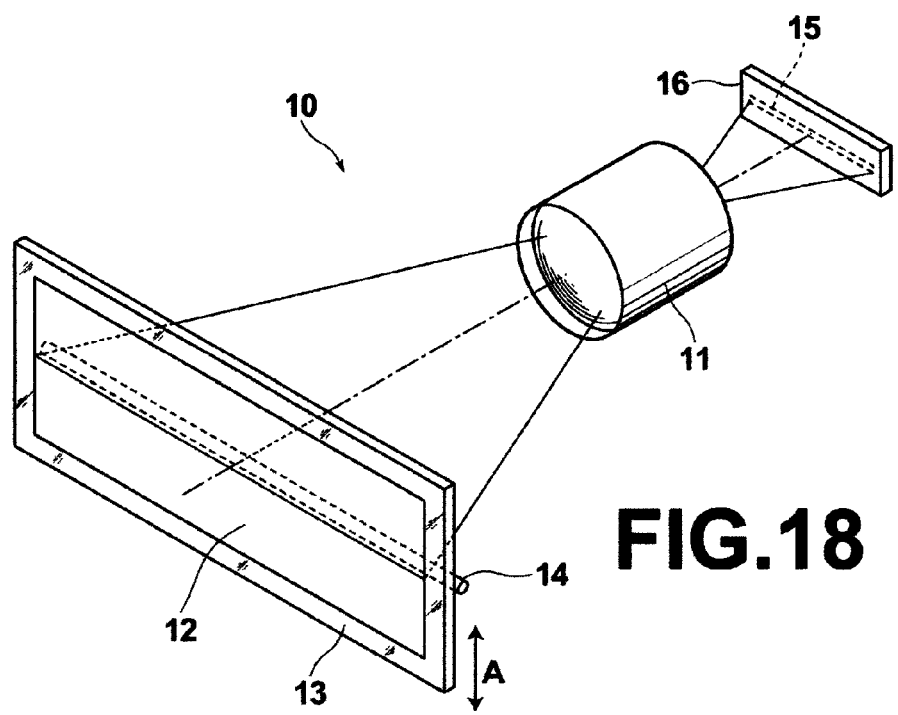
FIG. 18 is a schematic diagram illustrating the structure of an image readout apparatus of a line sensor type according to an embodiment of the present invention.

Next, an imaging apparatus according to an embodiment of the present invention will be described. FIG. 18 is a schematic diagram illustrating the structure of an image readout apparatus 10, as an imaging apparatus according to an embodiment of the present invention. The image readout apparatus 10 illustrated in FIG. 18 is a line-sensor-type readout apparatus for reading out an image in an original 12. The image readout apparatus 10 uses a reflective original method. The image readout apparatus 10 includes a readout lens 11, which is an imaging lens according to an embodiment of the present invention, an original mounting table 13 for holding the original 12 to be read out, a light source 14 for outputting illumination light to the original 12, an imaging device 15 for imaging an image in the original 12, and a cover glass 16 of the imaging device 15. FIG. 18 schematically illustrates a lens system, as the readout lens 11, in a collective manner.

The imaging device 15 converts an optical image formed by the readout lens 11 into electrical signals. The imaging device 15 is a line sensor in which pixels of a CCD, a CMOS (Complementary Metal Oxide Semiconductor) or the like for example are linearly arranged. Further, it is desirable that an optical element, such as a filter, is arranged between the readout lens 11 and the imaging device 15, or between the readout lens 11 and the original 12, if necessary.

The image readout apparatus 10 uses the readout lens 11 as a scan lens. An image in the original 12 is read out by moving the original 12 in a direction indicated by arrow A in FIG. 18. The direction indicated by arrow A is perpendicular to the direction of the optical axis of the readout lens 11 and to the long axial direction of the arrangement of pixels in the imaging device 15. In the image readout apparatus 10, illumination light is output from the light source 14 to the original 12. Further, light reflected by the original 12 passes through the readout lens 11, and an optical image representing an image in the original 12 is formed on the imaging device 15 by the image formation action of the readout lens 11. The imaging device 15 obtains, as image data, data representing an image formed thereon.

Figure 19:
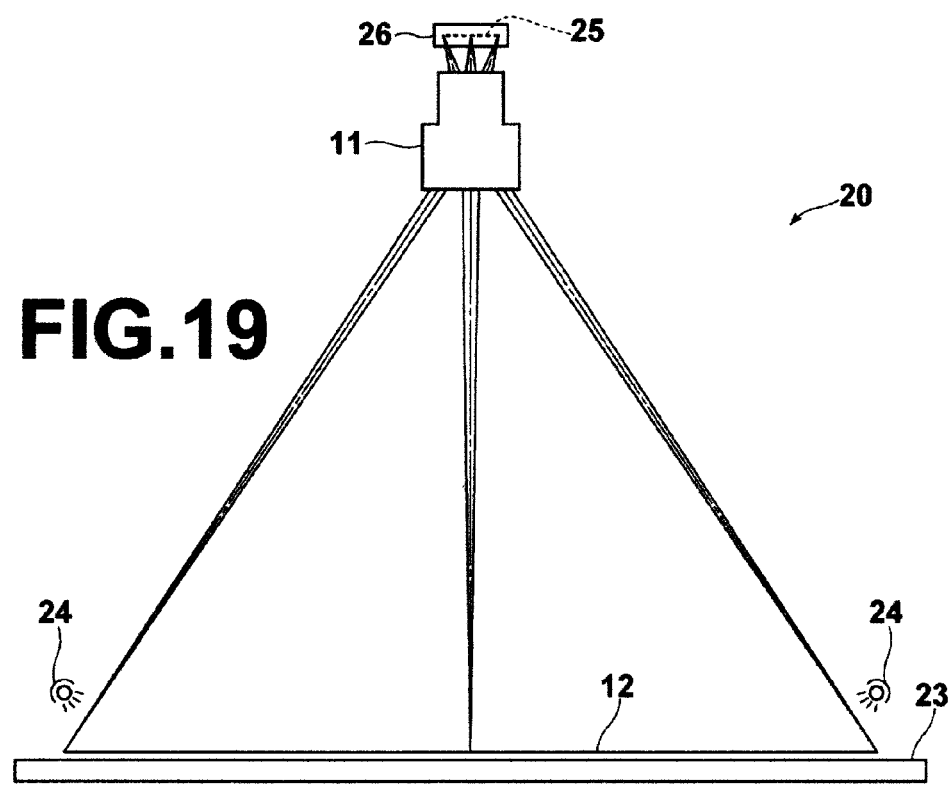
FIG. 19 is a schematic diagram illustrating the structure of an image readout apparatus of an area sensor type according to an embodiment of the present invention.

FIG. 18 illustrates an example, in which a line sensor is used as the imaging device 15. However, the present invention is not limited to this example, and an area sensor may be used as the imaging device. FIG. 19 is a schematic diagram illustrating the structure of an image readout apparatus 20 of an area sensor type, as an imaging apparatus according to another embodiment of the present invention.

The image readout apparatus 20 illustrated in FIG. 19 is a readout apparatus for reading an image in an original 12. The image readout apparatus 20 uses a reflective original method. The image readout apparatus 20 includes a readout lens 11, which is an imaging lens according to an embodiment of the present invention, an original mounting table 23 on which the original 12 to be read out is mounted, a light source 24 for outputting illumination light to the original 12, an imaging device 25 for imaging an image in the original 12, and a cover glass 26 of the imaging device 25. FIG. 19 schematically illustrates a lens system, as the readout lens 11, in a collective manner.

In the image readout apparatus 20, illumination light is output from the light source 24 to the original 12 in a manner similar to the image readout apparatus 10. Further, light reflected by the original 12 passes through the readout lens 11, and an optical image representing an image in the original 12 is formed on the imaging device 25 by the image formation action of the readout lens 11. Further, the imaging device 25 obtains, as image data, data representing an image formed thereon.

Further, various modifications are possible to the imaging apparatus of the present invention. For example, as in an image readout apparatus 30 illustrated in FIG. 20, a mirror 27 for deflecting an optical path may be inserted into the optical path of the image readout apparatus 20. A member for deflecting the optical path is not limited to the mirror, and a different member having a similar function may be used. When the imaging apparatus is structured in this manner, it is possible to further reduce the size of the apparatus. This structure of deflecting an optical path is applicable also to the image readout apparatus 10 illustrated in FIG. 18.

FIGS. 18 through 20 are diagrams illustrating image readout apparatuses using a reflective original method. However, the imaging apparatus of the present invention is not limited to these image readout apparatuses. The imaging apparatus of the present invention is applicable to an image readout apparatus using a transmissive original method for reading an image in an original, such as a negative film and a positive film. The image readout apparatus using the transmissive original method can be realized, for example, by changing the positions of the light sources in the image readout apparatuses illustrated in FIGS. 18 through 20. Light output from the light source passes through the original 12 and enters the readout lens 11. Further, the readout lens 11 forms, on the imaging device, an optical image of an image in the original 12.

So far, the present invention has been described by showing embodiments. However, the present invention is not limited to the embodiments as described above, and various modifications are possible. For example, it is not necessary that the imaging lens of the present invention is used as a lens for an image readout optical system. The imaging lens of the present invention may be applied to other optical systems. Further, it is not necessary that the imaging lens of the present invention is used in an optical system handling an object at a finite distance. The imaging lens of the present invention may be applied to an optical system handing an object at infinity. Further, the imaging lens of the present invention may be applied not only to an optical system for visible light but also to an optical system using infrared light.

Specifically, the imaging lens of the present invention may be applied, for example, to a camera for surveillance, an in-vehicle camera, a camera for verification or the like. When the imaging lens of the present invention is applied to the camera for surveillance or the like, rays enter the lens system at angles exceeding the angle of view in design specifications in some cases. Therefore, it is desirable that a stop for blocking unwanted rays is provided on the object side of the lens system, or between lenses, or the like to prevent stray light.

Further, various kinds of filter, such as an infrared-ray-cut filter, a visible-light-cut filter, and a filter onto which a water-repellent coating or a hydrophilic coating has been applied, may be arranged on the object side or the image side of the lens system based on the imaging apparatus in which the imaging lens is used. Alternatively, a coating that has a similar action to the various filters may be applied to a lens surface of at least one of lenses in the imaging lens.

The imaging lens of the present invention is not limited the aforementioned examples, and various modifications are possible. For example, the values of the radius of curvature of each lens element, distances between surfaces, refractive indices and Abbe numbers are not limited to the values shown in the examples, but may be other values.

What is claimed is:

1. An imaging lens comprising:
   a first lens that is a negative meniscus lens having a concave surface facing the image side of the imaging lens;
   a second lens that is a positive lens having a convex surface facing the object side of the imaging lens;
   a third lens that is a negative lens having a concave surface facing the image side;
   a fourth lens that is a double-convex lens;
   a fifth lens that is a negative meniscus lens having a concave surface facing the object side; and
   a sixth lens that is a negative lens, which are arranged in this order from the object side.

2. An imaging lens, as defined in claim 1, wherein the following Formula (1) is satisfied:

$$1.65 < (N2+N3+N4)/3 \qquad (1),$$

where
   $N2$ is the refractive index of the second lens with respect to e-line,
   $N3$ is the refractive index of the third lens with respect to e-line, and
   $N4$ is the refractive index of the fourth lens with respect to e-line.

3. An imaging lens, as defined in claim 1, wherein the following Formula (2) is satisfied:

$$1.50 < (N1+N6)/2 < 1.66 \qquad (2),$$

where
   $N1$ is the refractive index of the first lens with respect to e-line, and
   $N6$ is the refractive index of the sixth lens with respect to e-line.

4. An imaging lens, as defined in claim 1, wherein the following Formula (3) is satisfied:

$$0.5 < f1/f56 < 1.5 \qquad (3),$$

where
   $f1$ is the focal length of the first lens with respect to e-line, and
   $f56$ is the combined focal length of the fifth lens and the sixth lens with respect to e-line.

5. An imaging lens, as defined in claim 1, wherein the following Formula (4) is satisfied:

$$0.45 < Dp/f < 1.10 \qquad (4),$$

where
   $Dp$ is a distance, on an optical axis, between an object-side surface of the second lens and an image-side surface of the fourth lens, and
   $f$ is the focal length of the entire system of the imaging lens with respect to e-line.

6. An imaging lens, as defined in claim 1, wherein the following Formula (5) is satisfied:

$$0.7 < f2/f34 < 1.2 \qquad (5),$$

where
   $f2$ is the focal length of the second lens with respect to e-line, and
   $f34$ is the combined focal length of the third lens and the fourth lens with respect to e-line.

7. An imaging lens, as defined in claim 1, wherein the following Formula (6) is satisfied:

$$0.20 < Dn/f < 0.70 \qquad (6),$$

where
   $Dn$ is a distance, on an optical axis, between an image-side surface of the fourth lens and an image-side surface of the sixth lens, and
   $f$ is the focal length of the entire system of the imaging lens with respect to e-line.

8. An imaging lens, as defined in claim 1, wherein the following Formula (7) is satisfied:

$$0 < v4 - v3 < 25 \qquad (7),$$

where
   $v3$ is the Abbe number of the third lens with respect to d-line, and
   $v4$ is the Abbe number of the fourth lens with respect to d-line.

9. An imaging lens, as defined in claim 1, wherein the third lens and the fourth lens are cemented together to form a cemented lens having positive refractive power as a whole.

10. An imaging lens, as defined in claim 1, wherein the following Formulas (8) and (9) are satisfied:

$$1.65 < N5 \qquad (8);$$

and $$1.0 < R5im/R5ob < 3.0 \qquad (9),$$

where
   $N5$ is the refractive index of the fifth lens with respect to e-line,
   $R5ob$ is a radius of curvature of an object-side surface of the fifth lens, and
   $R5im$ is a radius of curvature of an image-side surface of the fifth lens.

11. An imaging lens, as defined in claim 1, wherein the following Formula (10) is satisfied:

$$0.0 \leq f/|R2im| < 0.67 \qquad (10),$$

where
   $f$ is the focal length of the entire system of the imaging lens with respect to e-line, and
   $R2im$ is a radius of curvature of an image-side surface of the second lens.

12. An imaging lens, as defined in claim 1, wherein the following Formula (11) is satisfied:

$$0.0 f/|R3ob| < 0.67 \qquad (11),$$

where
   $f$ is the focal length of the entire system of the imaging lens with respect to e-line, and
   $R3ob$ is a radius of curvature of an object-side surface of the third lens.

13. An imaging lens, as defined in claim 1, wherein the sixth lens is a meniscus lens having a convex surface facing the image side.

14. An imaging apparatus comprising:
   an imaging lens, as defined in claim 1.

* * * * *